US006522312B2

United States Patent
Ohshima et al.

(10) Patent No.: US 6,522,312 B2
(45) Date of Patent: *Feb. 18, 2003

(54) APPARATUS FOR PRESENTING MIXED REALITY SHARED AMONG OPERATORS

(75) Inventors: Toshikazu Ohshima, Kawasaki (JP); Kiyohide Sato, Kawasaki (JP); Hiroyuki Yamamoto, Chigasaki (JP); Masakazu Fujiki, Yokohama (JP); Naosato Taniguchi, Urawa (JP); Akihiro Katayama, Yokosuka (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/045,993

(22) Filed: Mar. 23, 1998

(65) Prior Publication Data
US 2002/0084974 A1 Jul. 4, 2002

(30) Foreign Application Priority Data

| Sep. 1, 1997 | (JP) | 9-236375 |
| Sep. 1, 1997 | (JP) | 9-236376 |
| Mar. 16, 1998 | (JP) | 10-065824 |

(51) Int. Cl.⁷ ................................................ G09G 5/00
(52) U.S. Cl. .................. 345/8; 345/7; 273/309; 463/2; 463/32; 463/39; 463/47.5; 463/49
(58) Field of Search .............. 273/309; 463/2, 463/32, 39, 47.5, 49; 345/7, 8

(56) References Cited

U.S. PATENT DOCUMENTS

| 4,398,799 A | * | 8/1983 | Swift | 345/7 |
| 5,353,042 A | * | 10/1994 | Klalpman et al. | 345/156 |
| 5,368,309 A | * | 11/1994 | Monroe et al. | 345/7 |

(List continued on next page.)

FOREIGN PATENT DOCUMENTS

| JP | 5-303053 | 11/1993 |
| JP | 06-047170 | 2/1994 |
| JP | 8-134958 | 5/1996 |

OTHER PUBLICATIONS

"AR²Hockey: A case Study of Collaborative Augmented Reality", Ohshima, et al., IEEE Virtual Reality Annual International Symposium, Los Alamitos, CA, IEEE Computer Soc., vol. Conf. 5, Mar. 14, 1998, pp. 268–275 X–000799843 ISBN: 0–7803–4782–X.

(List continued on next page.)

Primary Examiner—Bipin Shalwala
Assistant Examiner—Vincent E. Kovalick
(74) Attorney, Agent, or Firm—Fitzpatrick, Cella, Harper & Scinto

(57) ABSTRACT

There is disclosed a mixed reality presentation apparatus which generates and displays a three-dimensional virtual image on a see-through display device so as to allow a plurality of players to play a multi-player game in a mixed reality environment. The apparatus has a CCD camera for detecting the mallet positions of the plurality of players, and a sensor for detecting the view point position of each player in the environment of the multi-player game. The apparatus generates a three-dimensional virtual image that represents a game result of the multi-player game that has progressed in accordance with changes in mallet position detected by the CCD camera and is viewed from the view point position of each player detected by the sensor, and outputs the generated image to the corresponding see-through display device. The apparatus determines the motion of each player by detecting infrared rays output from the corresponding mallet on the basis of an image captured by the CCD camera. The view point position detected by the sensor is corrected by specifying the marker in an image obtained by a camera attached to the head of each player, and comparing the marker position in that image with an actual marker position.

62 Claims, 24 Drawing Sheets

U.S. PATENT DOCUMENTS

| | | | | |
|---|---|---|---|---|
| 5,423,554 | A | | 6/1995 | Davis |
| 5,495,576 | A | * | 2/1996 | Ritchey ....................... 395/125 |
| 5,577,981 | A | * | 11/1996 | Jarvik ............................ 482/4 |
| 5,605,505 | A | * | 2/1997 | Han ............................. 453/39 |
| 5,616,078 | A | * | 4/1997 | Oh ............................... 463/39 |
| 5,742,263 | A | * | 4/1998 | Wang et al. .................... 345/8 |
| 5,903,395 | A | * | 5/1999 | Rallison et al. ................ 345/8 |
| 5,913,727 | A | * | 6/1999 | Ahdoot ......................... 463/32 |

OTHER PUBLICATIONS

"Superior Augmented Reality Registration by Integrating Landmark Tracking and Magnetic Tracking", Andrei State, et al., Computer Graphics Proceedings, New York, NY: ACM, Aug. 4, 1996, pp. 429–438, XP000672659.

"Dynamic Registration Correction in Augmented–Reality Systems", Michael Bajura, et al., Proceedings of the Virtual Reality Annual International Symposium, Los Alamitos, IEEE Comp. Soc. Press, Mar. 11, 1995, pp. 189–196, XP000529985 ISBN: 0–7803–2543–5.

"Fore–Screen Display and Manipulation for Virtual World Interaction", Anonymous, IBM Technical Disclosure Bulletin, vol. 36, No. 3, pp. 45–46, XP002116340, New York, U.S.

"Nature and Origins of Virtual Environments: A Bibliographical Essay", S.R. Ellis, Computing Systems in Engineering, vol. 2, No. 4, 1991, pp. 321–347, XP000603084 ISSN: 0956–0521.

* cited by examiner

APPARATUS FOR PRESENTING MIXED REALITY SHARED AMONG OPERATORS

BACKGROUND OF THE INVENTION

The present invention relates to a mixed reality presentation apparatus for presenting to a user or operator mixed reality which couples a virtual image generated by computer graphics to the real space. The present invention also relates to an improvement of precise detection of, e.g., head position and/or posture of an operator to which mixed reality is presented.

In recent years, extensive studies have been made about mixed reality (to be abbreviated as "MR" hereinafter) directed to seamless coupling of a real space and virtual space. MR has earned widespread appeal as a technique for enhancing virtual reality (to be abbreviated as "VR" hereinafter) for the purpose of coexistence of the real space and the VR world that can be experienced in only a situation isolated from the real space.

Applications of MR are expected in new fields qualitatively different from VR used so far, such as a medical assistant use for presenting the state of the patient's body to a doctor as if it were seen through, a work assistant use for displaying the assembling steps of a product on actual parts in a factory, and the like.

These applications commonly require a technique of removing "deviations" between a real space and virtual space. The "deviations" can be classified into a positional deviation, time deviation, and qualitative deviation. Many attempts have been made to remove the positional deviation (i.e., alignment) as the most fundamental requirement among the above deviations.

In case of video-see-through type MR that superposes a virtual object on an image sensed by a video camera, the alignment problem reduces to accurate determination of the three-dimensional position of that video camera.

The alignment problem in case of optical-see-through type MR using a transparent HMD (Head Mount Display) amounts to determination of the three-dimensional position of the user's view point. As a method of measuring such position, a three-dimensional position-azimuth sensor such as a magnetic sensor, ultrasonic wave sensor, gyro, or the like is normally used. However, the precision of such sensors is not sufficient, and their errors produce positional deviations.

On the other hand, in the video-see-through system, a method of direct alignment on an image on the basis of image information without using such sensors may be used. With this method, since positional deviation can be directly processed, alignment can be precisely attained. However, this method suffers other problems, i.e., non-real-time processing, and poor reliability.

In recent years, attempts for realizing precise alignment by using both a position-azimuth sensor and image information since they compensate for each other's shortcomings have been reported.

As one attempt, "Dynamic Registration Correction in Video-Based-Augmented Reality Systems" (Bajura Michael and Ulrish Neuman, IEEE computer Graphics and Applications 15, 5, pp. 52–60, 1995) (to be referred to a first reference hereinafter) has proposed a method of correcting a positional deviation arising from magnetic sensor errors using image information in video-see-through MR.

Also, "Superior Augmented Reality Registration by Integrating Landmark Tracking and Magnetic Tracking" (State Andrei et al., Proc. of SIGGRAPH 96, pp. 429–438, 1996) (to be referred to as a second reference hereinafter) has proposed a method which further develops the above method, and compensates for ambiguity of position estimation based on image information. The second reference sets a landmark, the three-dimensional position of which is known, in a real space so as to remove any position deviation on an image caused by sensor errors when a video-see-through MR presentation system is built using only a position-azimuth sensor. This landmark serves as a yardstick for detecting the positional deviation from image information.

If the output from the position-azimuth sensor does not include any errors, a coordinate point (denoted as Ql) of the landmark actually observed on the image must agree with a predicted observation coordinate point (denoted as $P_i$) of the landmark, which is calculated from the camera position obtained based on the sensor output, and the three-dimensional position of the landmark.

However, in practice, since the camera position obtained based on the sensor output is not accurate, $Q_1$ and $P_1$ do not agree with each other. The deviation between the predicted observation coordinate $Q_1$ and land mark coordinate $P_1$ represents the positional deviation between the landmark positions in the virtual and real spaces and, hence, the direction and magnitude of the deviation can be calculated by extracting the landmark position from the image.

In this way, by qualitatively measuring the positional deviation on the image, the camera position can be corrected to remove the positional deviation.

The simplest alignment method using both a position-azimuth sensor and image is correction of sensor errors using one point of landmark, and the first reference proposed a method of translating or rotating the camera position in accordance with the positional deviation of the landmark on the image.

FIG. 1 shows the basic concept of positional deviation correction using one point of landmark. In the following description, assume that the internal parameters of a camera are known, and an image is sensed by an ideal image sensing system free from any influences of distortion and the like.

Let C be the view point position of the camera, $Q_I$ be the observation coordinate position of a landmark on an image, and $Q_C$ be the landmark position in a real space. Then, the point $Q_I$ is present on a line $l_Q$ that connects the points C and $Q_C$. On the other hand, from the camera position given by the position-azimuth sensor, a landmark position $P_C$ on the camera coordinate system, and its observation coordinate position $P_I$ on the image can be estimated. In the following description, $v_1$ and $v_2$ respectively represent three-dimensional vectors from the point C to the points $Q_I$ and $P_I$. In this method, positional deviation is corrected by modifying relative positional information between the camera and object so that a corrected predicted observation coordinate position $P'_I$ of the landmark agrees with $Q_I$ (i.e., a corrected predicted landmark position $P'_C$ on the camera coordinate system is present on the line $l_Q$).

A case will be examined below wherein the positional deviation of the landmark is corrected by rotating the camera position. This correction can be realized by modifying the position information of the camera so that the camera rotates an angle q that the two vectors $v_1$ and $v_2$ make with each other. In actual calculations, vectors $v_{1n}$ and $v_{2n}$ obtained by normalizing the above vectors $v_1$ and $v_2$ are used, their outer product $v_{1n} \times v_{2n}$ is used as the rotation axis, their inner product $v_{1n} \cdot v_{2n}$ is used as the rotation angle, and the camera is rotated about the point C.

A case will be examined below wherein the positional deviation of the landmark is corrected by relatively translating the camera position. This correction can be realized by translating the object position in the virtual world by v=n (v₁-v₂). Note that n is a scale factor defined by:

$$n = \frac{|CP_C|}{|CP_I|} \quad (1)$$

Note that |AB| is a symbol representing the distance between points A and B. Likewise, correction can be attained by modifying the position information of the camera so that the camera translates by -v. This is because this manipulation is equivalent to relative movement of a virtual object by v.

The above-mentioned two methods two-dimensionally adjust the positional deviation on the landmark but cannot correct the camera position to a three-dimensionally correct position. However, when sensor errors are small, these methods can expect sufficient effects, and the calculation cost required for correction is very small. Hence, these methods are excellent in real-time processing.

However, the above references do not consider any collaborative operations of a plurality of operators, and can only provide a mixed reality presentation system by a sole operator.

Since the methods described in the references need to detect a coordinate of the only land mark within the sensed image, thus, have limitations that a specific marker as a mark for alignment must always be sensed by the camera, they allow observation within only a limited range.

The above limitation derived from using the single land mark is fatal to construction of mixed reality space shared by a plurality of users or operators.

SUMMARY OF THE INVENTION

The present invention has been made in consideration of the conventional problems, and has as its object to provide an apparatus that presents a collaborative operation of a plurality of operators by mixed reality In order to achieve the above object, according to the present invention, a mixed reality presentation apparatus which generates a three-dimensional virtual image associated with a collaborative operation to be done by a plurality of operators in a predetermined mixed reality environment, and displays the generated virtual image on see-through display devices respectively attached to the plurality of operators, comprises:

first sensor means for detecting a position of each of actuators which are operated by the plurality of operators and move as the collaborative operation progresses;

second sensor means for detecting a view point position of each of the plurality of operators in an environment of the collaborative operation; and generation means for generating three-dimensional images for the see-through display devices of the individual operators, the generation means generating a three-dimensional virtual image representing an operation result of the collaborative operation that has progressed according to a change in position of each of the plurality of actuators detected by the first sensor means when viewed from the view point position of each operator detected by the second sensor means, and outputting the generated three-dimensional virtual image to each see-through display device.

Since the first sensor means of the present invention detects the positions of the individual actuators operated by the operators, the positional relationship between the actuators of the operators can be systematically recognized, and mixed reality based on their collaborative operation can be presented without any positional deviation.

In order to track the collaborative operation by all the operators, a camera which covers substantially all the operators within its field of view is preferably used. Hence, according to a preferred aspect of the present invention, the first sensor means comprises:

an image sensing camera which includes a maximum range of the actuator within a field of view thereof, the position of the actuator moving upon operation of the operator; and image processing means for detecting the position of the actuator by image processing from an image obtained by the camera.

In order to present mixed reality based on the collaborative operation, detection of some operations of the operators suffices. For this reason, according to a preferred aspect of the present invention, when the first sensor means uses a camera, the actuator outputs light having a predetermined wavelength, and the first sensor means comprises a camera which is sensitive to the light having the predetermined wavelength.

According to a preferred aspect of the present invention, the actuator is a mallet operated by a hand of the operator. The mallet can be easily applied to a mixed reality environment such as a game.

According to a preferred aspect of the present invention, the see-through display device comprises an optical transmission type display device.

According to a preferred aspect of the present invention, the second sensor means detects a head position and posture of each operator, and calculates the view point position in accordance with the detected head position and posture.

In order to detect the three-dimensional posture of the head of each operator, a magnetic sensor is preferably used. Therefore, according to a preferred aspect of the present invention, the second sensor means comprises a transmitter for generating an AC magnetic field, and a magnetic sensor attached to the head portion of each operator. With this arrangement, the three-dimensional posture of the head of each operator can be detected in a non-contact manner.

According to a preferred aspect of the present invention, the generation means comprises:

storage means for storing a rule of the collaborative operation;

means for generating a virtual image representing a progress result of the collaborative operation in accordance with the rule stored in the storage means in correspondence with detected changes in position of the plurality of actuators; and means for generating a three-dimensional virtual image for each view point position by transferring a coordinate position for each view point position of each operator detected by the second sensor means.

Similarly, in order to achieve the above object, according to the present invention, a mixed reality presentation apparatus which generates a three-dimensional virtual image associated with a collaborative operation to be done by a plurality of operators in a predetermined mixed reality environment, and displays the generated virtual image on see-through display devices respectively attached to the plurality of operators, comprises:

a camera which includes a plurality of actuators operated by the plurality of operators in the collaborative operation within a field of view thereof;

actuator position detection means for outputting information associated with positions of the actuators on a coordinate system of that environment on the basis of an image sensed by the camera;

sensor means for detecting and outputting a view point position of each of the plurality of operators in the environment of the collaborative operation; and image generation means for outputting a three-dimensional virtual image of a progress result viewed from the view point position of each operator detected by the sensor means to each see-through display device so as to present the progress result of the collaborative operation that has progressed according to detected changes in position of the actuator to each operator.

The above object is also achieved by a mixed reality presentation apparatus which generates a three-dimensional virtual image associated with a collaborative operation to be done by a plurality of operators in a predetermined mixed reality environment, and displays the generated virtual image on see-through display devices respectively attached to the plurality of operators. This apparatus comprises:

a camera which includes a plurality of actuators operated by the plurality of operators in the collaborative operation within a field of view thereof;

actuator position detection means for outputting information associated with positions of the actuators on a coordinate system of that environment on the basis of an image sensed by the camera;

sensor means for detecting and outputting a view point position of each of the plurality of operators in the environment of the collaborative operation; and image generation means for outputting a three-dimensional virtual image of a progress result viewed from the view point position of each operator detected by the sensor means to each see-through display device so as to present the progress result of the collaborative operation that has progressed according to detected changes in position of the actuator to each operator.

The above object is also achieved by a mixed reality presentation apparatus which generates a three-dimensional virtual image associated with a collaborative operation to be done by a plurality of operators in a predetermined mixed reality environment, and displays the generated virtual image on see-through display devices respectively attached to the plurality of operators. This comprises:

a first camera which substantially includes the plurality of operators within a field of view thereof;

a first processor for calculating operation positions of the plurality of operators on the basis of an image obtained by the first camera;

a detection device for detecting a view point position of each operator using a plurality of sensors attached to the plurality of operators;

a plurality of second cameras for sensing front fields of the individual operators, at least one second camera being attached to each of the plurality of operators;

a second processor for calculating information associated with a line of sight of each operator on the basis of each of images from the plurality of second cameras;

a third processor for correcting the view point position of each operator detected by the sensor using the line of sight information from the second processor and outputting the corrected view point position as a position on a coordinate system of the mixed reality environment;

a first image processing device for making the collaborative operation virtually progress on the basis of the operation position of each operator calculated by the first processor, and generating three-dimensional virtual images representing results that have changed along with the progress of the collaborative operation for the plurality of operators; and a second image processing device for transferring coordinate positions of the three-dimensional virtual images for the individual operators generated by the first image processing device in accordance with the individual corrected view point positions calculated by the third processor, and outputting the coordinate-transferred images to the see-through display devices.

The above object is also achieved by a method of generating a three-dimensional virtual image associated with a collaborative operation to be done within a predetermined mixed reality environment so as to display the image on see-through display devices attached to a plurality of operators in the mixed reality environment. This method comprises:

the image sensing step of sensing a plurality of actuators operated by the plurality of operators by a camera that includes the plurality of operators within a field of view thereof;

the actuator position acquisition step of calculating information associated with positions of the actuators on a coordinate system of the environment on the basis of the image sensed by the camera;

the view point position detection step of detecting a view point position of each of the plurality of operators in the environment of the collaborative operation on the coordinate system of the environment;

the progress step of making the collaborative operation virtually progress in accordance with changes in position of the plurality of actuators calculated in the actuator position acquisition step; and the image generation step of outputting a three-dimensional virtual image of a progress result in the progress step viewed from the view point position of each operator detected in the view point position detection step to each see-through display device so as to present the progress result in the progress step to each operator.

The above object is also achieved by a mixed reality presentation method for generating a three-dimensional virtual image associated with a collaborative operation to be done by a plurality of operators in a predetermined mixed reality environment, and displaying the generated virtual image on see-through display devices respectively attached to the plurality of operators. This method comprises:

the first image sensing step of capturing an image using a first camera which substantially includes the plurality of operators within a field of view thereof;

the first detection step of detecting operation positions of the plurality of operators on the basis of the image sensed by the first camera;

the second detection step of detecting a view point position of each operator using a plurality of sensors respectively attached to the plurality of operators;

the second image sensing step of sensing a front field of each operator using each of a plurality of second cameras, at least one second camera being attached to each of the plurality of operators;

the line of sight calculation step of calculating information associated with a line of sight of each operator on the basis of each of images obtained from the plurality of second cameras;

the correction step of correcting the view point position of each operator detected by the sensor on the basis of the line of sight information calculated in the line of sight calculation step, and obtaining the corrected view point position as a position on a coordinate system of the mixed reality environment;

the generation step of making the collaborative operation virtually progress on the basis of the operation positions of the individual operators detected in the first detection step, and generating three-dimensional virtual images that represent results of the collaborative operation and are viewed from the view point positions of the plurality of operators; and the step of transferring coordinate positions of the three-dimensional virtual images for the individual operators generated in the generation step in accordance with the individual corrected view point positions obtained in the correction step, and outputting the coordinate-transferred images to the see-through display devices.

It is another object of the present invention to provide a position posture detection apparatus and method, which can precisely capture an operator who moves across a broad range, and a mixed reality presentation apparatus based on the detected position and posture.

In order to achieve the above object, the present invention provides a position/posture detection apparatus for detecting an operation position of an operator so as to generate a three-dimensional virtual image that represents an operation done by the operator in a predetermined mixed reality environment, comprising:

a position/posture sensor for measuring a three-dimensional position and posture of the operator to output an operator's position and posture signal;

a camera sensing images of a first plurality of markers arranged at known positions in the environment;

detection means for processing an image signal from said camera, tracking a marker of the first plurality of markers, and detecting a coordinate value of the tracked marker in a coordinate system; and calculation means for calculating a portion-position and -posture representing a position and posture of the operating portion, on the basis of the coordinate value of the tracked marker detected by said detection means and the operator's position and posture signal outputted from the position/posture sensor.

In order to achieve the above object, the present invention provides a position/posture detection method for detecting an operation position of an operator so as to generate a three-dimensional virtual image associated with an operation to be done by the operator in a predetermined mixed reality environment, comprising:

the step of measuring to output an operator position/posture signal indicative of a three-dimensional position and posture of the operator;

the step of processing an image signal from a camera which captures a plurality of markers arranged in the environment, tracking at least one marker and detecting a coordinate of said at least one marker; and outputting a head position/posture signal indicative of a position and posture of the head of the operator, on the basis of the coordinate of the tracked marker and the measured operator position/posture signal.

In order to achieve the above object, the present invention provides a position/posture detection apparatus for detecting an operation position of an operator, comprising:

a position/posture sensor for measuring a three-dimensional position and posture of the operator to output an operator's position and posture signal;

a camera sensing images of a first plurality of markers arranged at known positions in the environment;

detection means for processing an image signal from said camera, tracking a marker of the first plurality of markers, and detecting a coordinate value of the tracked marker in a coordinate system; and correction means for correcting an output signal from the sensor on the basis of coordinate value of the tracked marker.

In order to achieve the above object, the present invention provides a mixed reality presentation apparatus comprising:

a work table having a first plurality of markers arranged at known positions;

a position/posture sensor attached to an operator to detect a head posture of the operator;

a camera being set to capture at least one of the first plurality of markers within a field of view of the camera;

a detection means for processing an image signal from the camera, tracking a marker from among the first plurality of markers, and detecting a coordinate value of a tracked marker;

calculation means for calculating a position/posture signal representing a position and posture of the operator's view point, on the basis of the coordinate value of the tracked marker detected by said detection means and an operator's head position/posture signal outputted from the position/posture sensor; and generation means for generating a virtual image for presenting a mixed reality at the view point in accordance with the calculated position/posture signal.

The detection apparatus and method according to the invention as set forth can correct or detect a position and posture of the operator precisely even when the operator moves within a wide range environment, since at least one marker is assured to be captured in the image by the camera.

According to a preferred aspect of the invention, the markers are arranged so that a distance between one marker and another marker of the plurality of markers in a direction crossing in front of the operator is set to be larger as the markers are farther from the operator. This prevents from deterioration of precision in identifying a marker.

According to a preferred aspect of the invention, the markers are arranged so that a layout distribution density of the plurality of markers in the environment is set so that a density distribution of markers farther from the operator is set to be lower than a density distribution of markers closer to the operator. This also prevents from deterioration of precision in identifying a marker.

According to a preferred aspect of the invention, where a plurality of operators perform a collaborative operation, markers for one operator are of the same representation manner. The markers for one operator have the same color, for example. This facilitates to discriminate markers from those for each other operator.

According to a preferred aspect of the invention, the portion is a view point position of the operator.

According to a preferred aspect of the invention, said detection means uses a marker firstly found within an image obtained by said camera. It is not necessary to keep to tack one marker in the invention. It is enough for any one marker to be found. Using a first found marker facilitates to search or track a marker.

According to a preferred aspect of the invention, the detection means searches an image of a present scene for a marker found in an image of a previous scene. This assures continuity in the tracking.

The sensor may be mounted anywhere of the operator. According to a preferred aspect of the invention, the sensor is mounted on the head of the operator. The sensor is close to the view point of the operator. This facilitates application to HMD.

According to a preferred aspect of the invention, the first plurality of markers are arranged within the environment so that at least one marker is captured within the field of image of the camera.

Detection of tracked marker can be made in various coordinate systems. According to a preferred aspect of the invention, said detection means calculates a coordinate of the tracked marker in an image coordinate system. According to a preferred aspect of the invention, said detection means calculates a coordinate of the tracked marker in camera coordinate system.

According to a preferred aspect of the invention, the first plurality of markers are depicted on a planar table arranged within the environment. This is suitable for a case where the collaborative operation is made on the table.

According to a preferred aspect of the invention, said first plurality of markers are arranged in a three-dimensional manner. This aspect is suitable for a case where markers must be arranged in a three-dimensional manner.

According to a preferred aspect of the invention, the detection means comprises identifying means for identifying a marker to be tracked from among said first plurality of markers.

Similarly, according to a preferred aspect of the invention, the detection means comprises means for selecting, where said detection means detects a second plurality of markers within an image capture by said camera, one marker to be tracked from among said second plurality of markers.

According to a preferred aspect of the invention, the identifying means identifies a marker selected by the selection means in terms of an image coordinate system.

According to a further aspect of the invention, the identifying means comprises:
  means for detecting a signal representing a position/posture of the camera;
  means for converting three-dimensional coordinates of said first plurality of markers in the world coordinate system into a coordinate value in terms of the image coordinate system, in accordance with the signal representing position/posture of the camera; and
  means for identifying a marker to be tracked by comparing the coordinates of the first plurality of markers in the image coordinate system and an image coordinate value of the tracked marker.

According to another aspect of the invention, the identifying means identifies a marker selected by the selection means in terms of a world coordinate system. And, according to yet further aspect of the invention, the identifying means comprises:
  means for detecting a signal representing a position/posture of the camera;
  means for converting a coordinate of the tracked marker in terms of a camera coordinate system into a coordinate value in terms of the world coordinate system; and
  selection means for selecting said at least one marker to be tracked by comparing coordinates of the second plurality of markers and coordinates of the first plurality of markers, in terms of the world coordinate system.

Where an image coordinate system is used, according to a yet further aspect of the invention, the operation portion includes a view position of the operator,
  said calculation means obtains a position/posture signal at a view point of the operator on the basis of:
  said operator position/posture signal, and
  a distance difference between an image coordinate value of the tracked marker and a coordinate value of the tracked marker which is converted from a three dimensional coordinate of the marker in the world coordinate system.

Where a world coordinate system is used, according to a yet further aspect of the invention, the operation portion includes a vie position of the operator,
  said calculation means obtains a position/posture signal at a view point of the operator on the basis of:
  said operator position/posture signal, and
  a distance difference between a coordinate value of the tracked marker which is converted from the camera coordinate system into the world coordinate system and a three dimensional coordinate of the marker in the world coordinate system and a coordinate value of the tracked marker.

The camera may comprises plural camera units. This allows to detect a coordinate of a tracked marker in a camera coordinate system. Thus, Error in the position/posture sensor is corrected in three-dimensional manner. Further, The tracked marker is identified in the world coordinate system, the multiple cameras can cope with the markers arranged three-dimensionally. Furthermore, Preciseness in identifying a racked marker is improved compared with that in the image coordinate system.

Other features and advantages of the present invention will be apparent from the following description taken in conjunction with the accompanying drawings, in which like reference characters designate the same or similar parts throughout the figures thereof.

DETAILED DESCRIPTION OF THE INVENTION

A system according to an embodiment in which a mixed reality presentation method and HMD of the present invention are applied to an air hockey game apparatus will be explained hereinafter.

An air hockey game is a battle game requiring at least two players, and the players exchange shots of a puck, which floats in the air by compressed air from the lower portion, and can score when one player shoots the puck into the goal of the other player. The outscored player can win the game. In the air hockey game to which MR of this embodiment is applied, a virtual puck is presented to a player by superpose-displaying it as a virtual three-dimensional image on a table in a real environment, and the players virtually exchange shots of the virtual puck using real mallets.

The game apparatus is featured by:

○: Image-sensing with a camera a real space shared by a plurality of players, detecting and specifying actuators (mallets in the embodiments) manipulated by the operators, and presenting a mixed reality space shared by the players

[: In order to detect view points of the players precisely who move within the wide real space, a camera as well as a magnetic sensor is attached to the head of each player, senses at least one marker of markers provided on a table used for the game, and corrects position and posture (that is, view point) of a player's head detected by the sensor, on the basis of a difference between the image coordinate and the actual position of the at least one marker.

<Arrangement of Game Apparatus>

Figure 2:
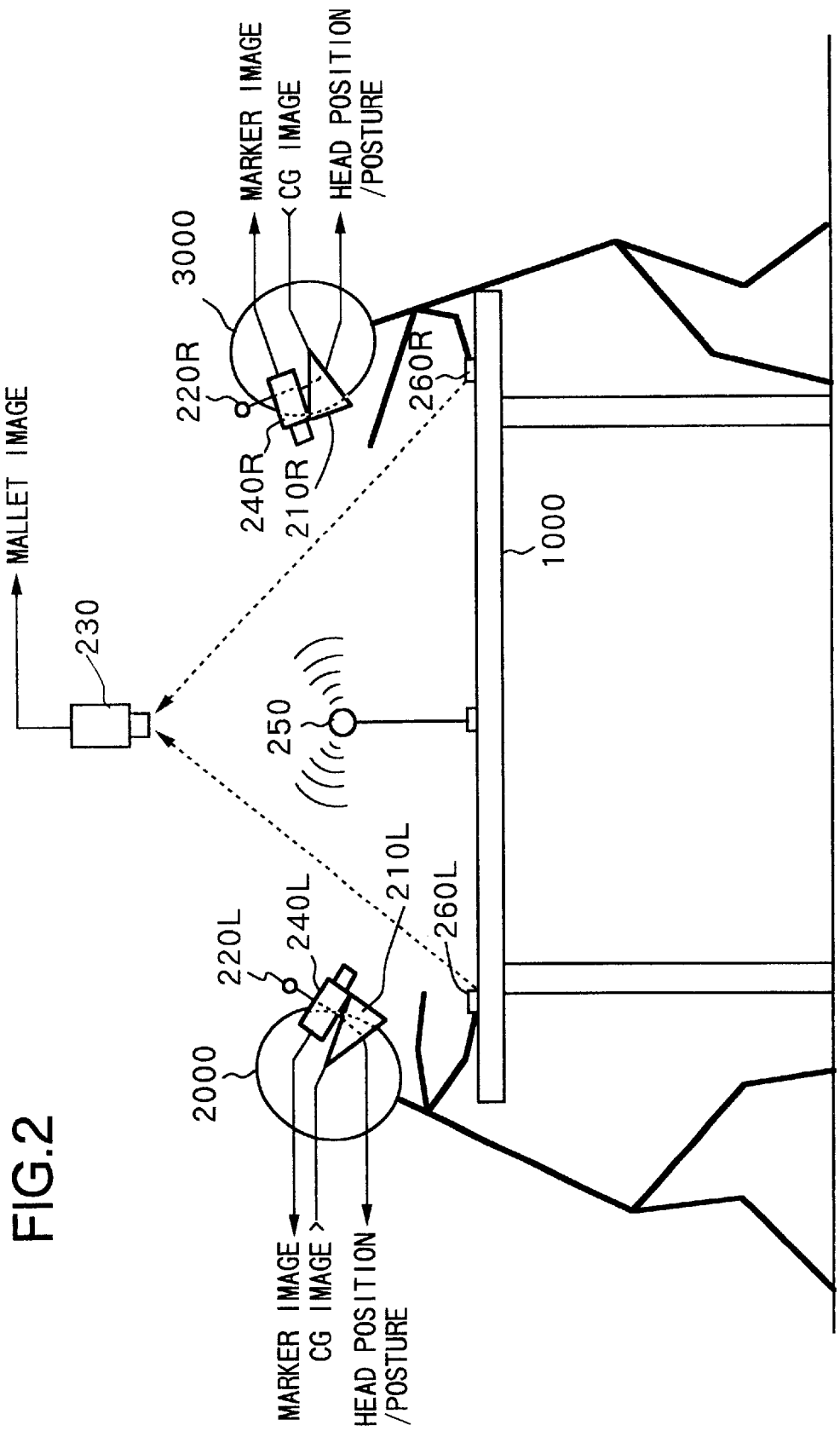
FIG. 2 is a side view showing the arrangement of a game apparatus used in the first embodiment of the present invention.

FIG. 2 is a side view of the game apparatus portion of the system of this embodiment. In an MR air hockey game, two players 2000 and 3000 face each other while holding mallets (260L, 260R) with their hands. The two players 2000 and 3000 wear head mount displays (to be abbreviated as HMDs hereinafter) 210L and 210R on their heads. The mallet of this embodiment has an infrared ray generator at its distal end. As will be described later, in this embodiment, the mallet position is detected by image processing. If each mallet has a feature in its shape or color, the mallet position can also be detected by pattern recognition using such feature.

Figure 4:
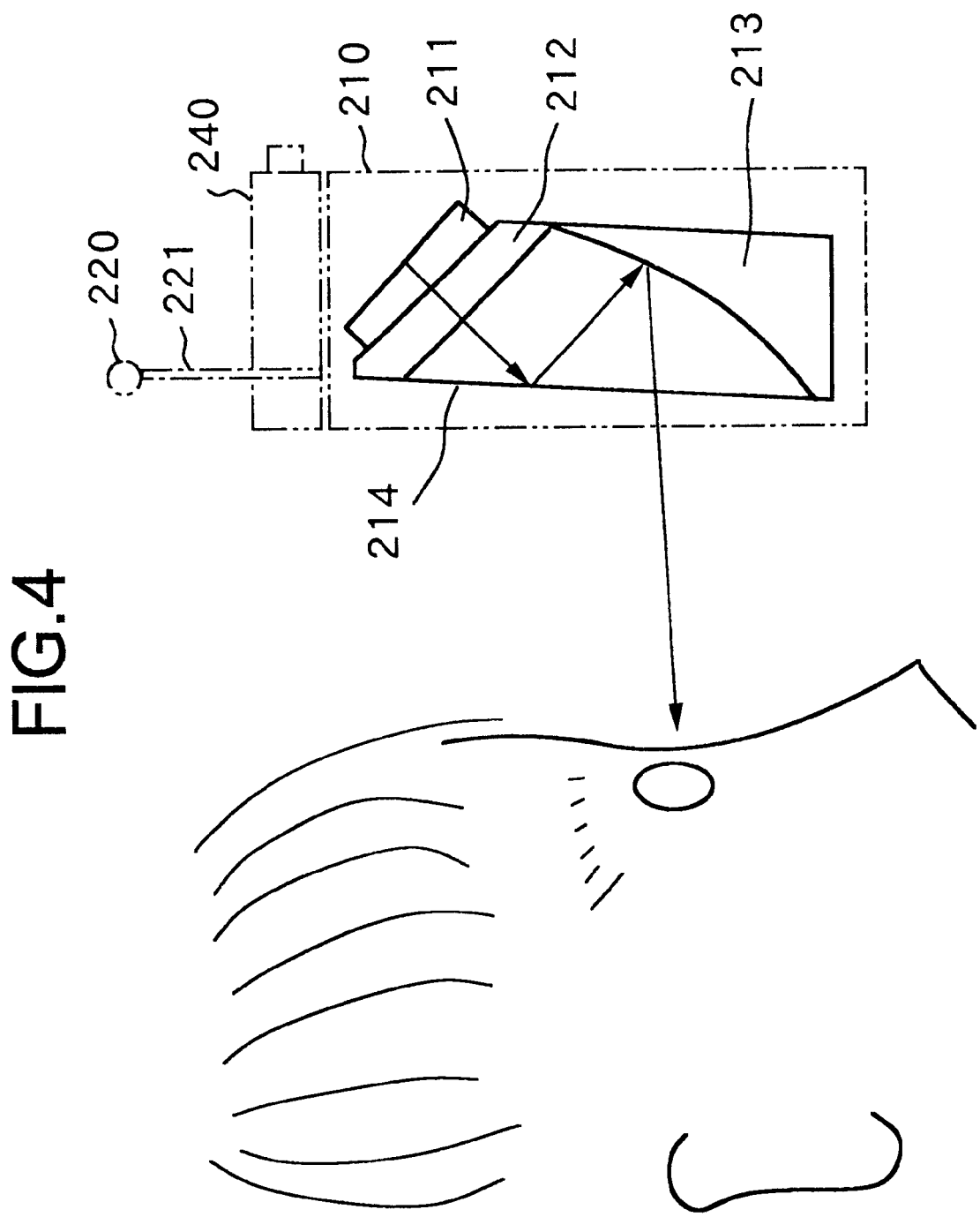
FIG. 4 is a view for explaining the arrangement of an HMD used in the game apparatus shown in FIG. 2.

The HMD 210 of this embodiment is of see-through type, as shown in FIG. 4. The two players 2000 and 3000 can observe the surface of a table 1000 even when they wear the HMDs 210L and 210R. The HMD 210 receives a three-dimensional virtual image from an image processing system (to be described later). Hence, the players 2000 and 3000 observe a three-dimensional image displayed on the display screen of their HMDs 210 to be superposed on an image in the real space observed via optical systems (not shown in FIG. 2) of the HMDs 210.

Figure 3:
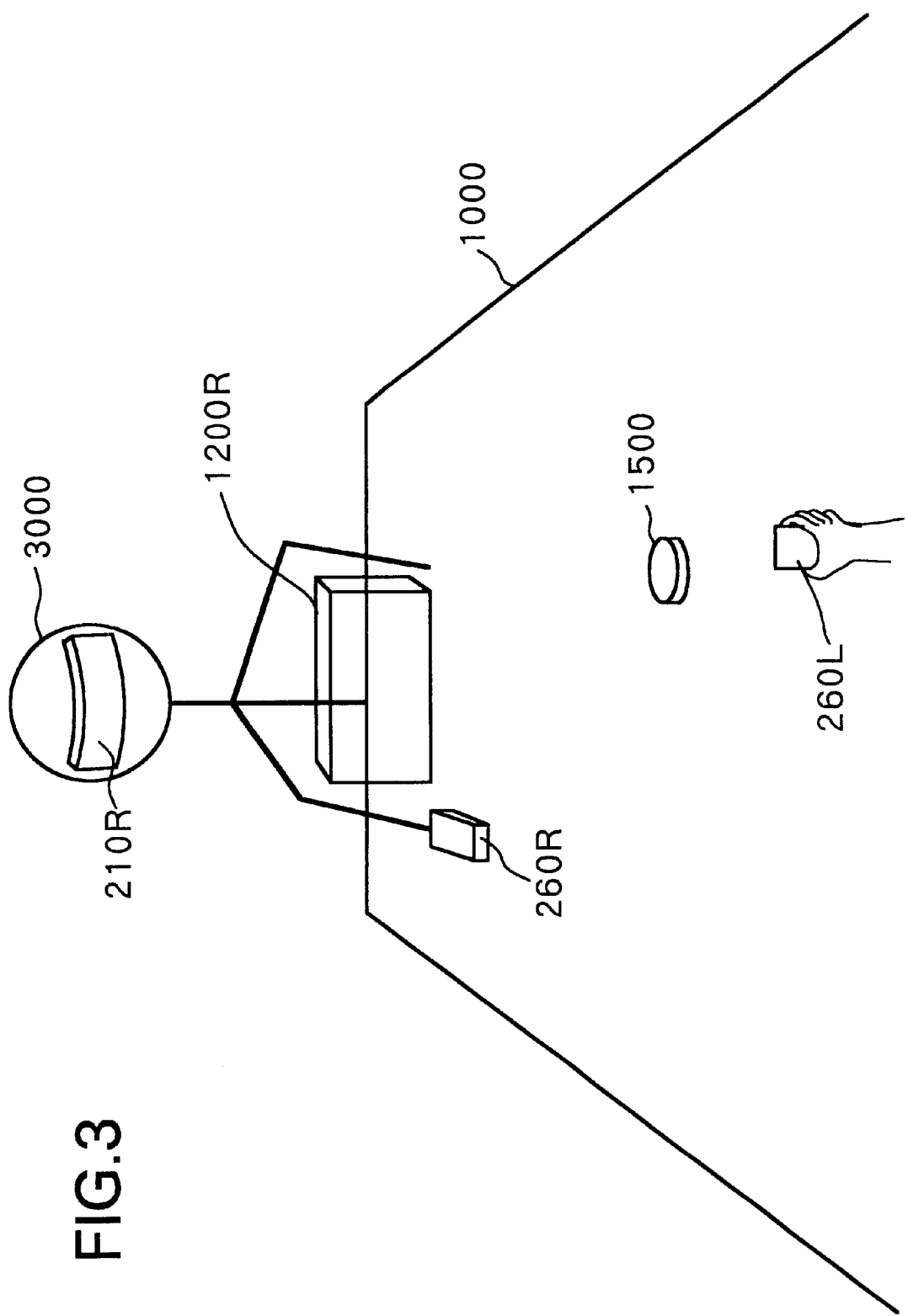
FIG. 3 is a view for explaining a scene that can been seen within the field of view of the left player in the game apparatus shown in FIG. 2.

FIG. 3 shows an image seen by the left player 2000 via his or her HMD 210L. The two players 2000 and 3000 exchange shots of a virtual puck 1500. The puck 1500 is hit by an actual mallet 260L (260R) held by the hand of the player 2000 (3000). The player 2000 holds the mallet 260L with the hand. The player 2000 can see a goal 1200R immediately before the opponent 3000. The image processing system (to be described later; not shown in FIG. 3) generates a three-dimensional CG so that the player 2000 can see the goal 1200R near the opponent, and displays it on the HMD 210L.

The opponent 3000 can also see a goal 1200L near the player 2000 via the HMD 210R.

The puck 1500 is also generated by the image processing system (to be described later), and is displayed on the HMDs of the two players.

<HMD with Magnetic Sensor>

FIG. 4 shows the arrangement of the HMD 210. This HmD 210 is obtained by attaching a magnetic sensor 220 to the main body of an HMD in, e.g., Japanese Laid-Open Patent No. 7-333551 via a column 221. In FIG. 4, reference numeral 211 denotes an LCD display panel. Light coming from the LCD display panel enters an optical member 212, and is reflected by a total reflection surface 214. Then, the light is reflected by a total reflection surface of a convex mirror 213, is transmitted through the total reflection surface 214, and then reaches the eyes of the observer.

The magnetic sensor 220 used a magnetic sensor Fastrak available from Polhemus Corp. Since the magnetic sensor is readily influenced by magnetic noise, it is separated from the display panel 211 and a camera 240 as noise sources by means of a pole 221 made of plastic.

Note that the arrangement obtained by attaching the magnetic sensor and/or camera to the HMD shown in FIG. 4 is not limited to an optical-see-through type HMD. Also, even in a video-see-through type HMD, the magnetic sensor and/or camera can be attached to that HMD for the purpose of accurate detection of the head position and posture.

In FIG. 2, each HMD 210 is fixed to the player's head by a band (not shown). The magnetic sensor 220 (FIG. 4) and a CCD camera 240 (240L, 240R; FIG. 2) are respectively fixed to the head of the player. The field of view of the camera 240 is set in the forward direction of the player. When such HMD as comprises the magnetic sensor 220 and camera 240 is used in an air hockey game, since each player observes the upper surface of the table 1000, the camera 240 senses an image of the surface of the table 1000. The magnetic sensor 220 (220L, 220R) senses changes in AC magnetic field generated by an AC magnetic field generation source 250.

As will be described, images sensed by the camera 240 will be utilized to correct a position and posture of head detected by the magnetic sensor 220.

When the player looks obliquely downward to observe the surface of the table 1000, he or she can see the surface of the table 1000, the above-mentioned virtual puck 1500, the real mallet 260 (260L, 260R), and the virtual goal 1200 (1200L, 1200R) within the field of view via the HMD 210. When the player horizontally moves the head within a horizontal two-dimensional plane, or makes a tilting, yaw, or rolling motion, such changes are detected by the magnetic sensor 220, and are also observed as changes in image sensed by the CCD camera 240 in accordance with changes in posture of the head. Specifically, the signal indicative of head position from the magnetic sensor 220 will be corrected by subjecting images by the camera to image-processing, as will be described later.

<A Plurality of Markers>

Mallet 260 held by each player has an infrared ray generator at its distal end, and each mallet position in a two-dimensional plane on the table 1000 is detected by a CCD camera 230 that detects the infrared rays. Specifically, the camera 230 is provided so that it may detect mallet positions of the players, and the detected positions of the players will be used for advancing or progressing the game, for this embodiment.

On the other hand, the CCD camera 240 outputs an image called a marker image.

Figure 5:
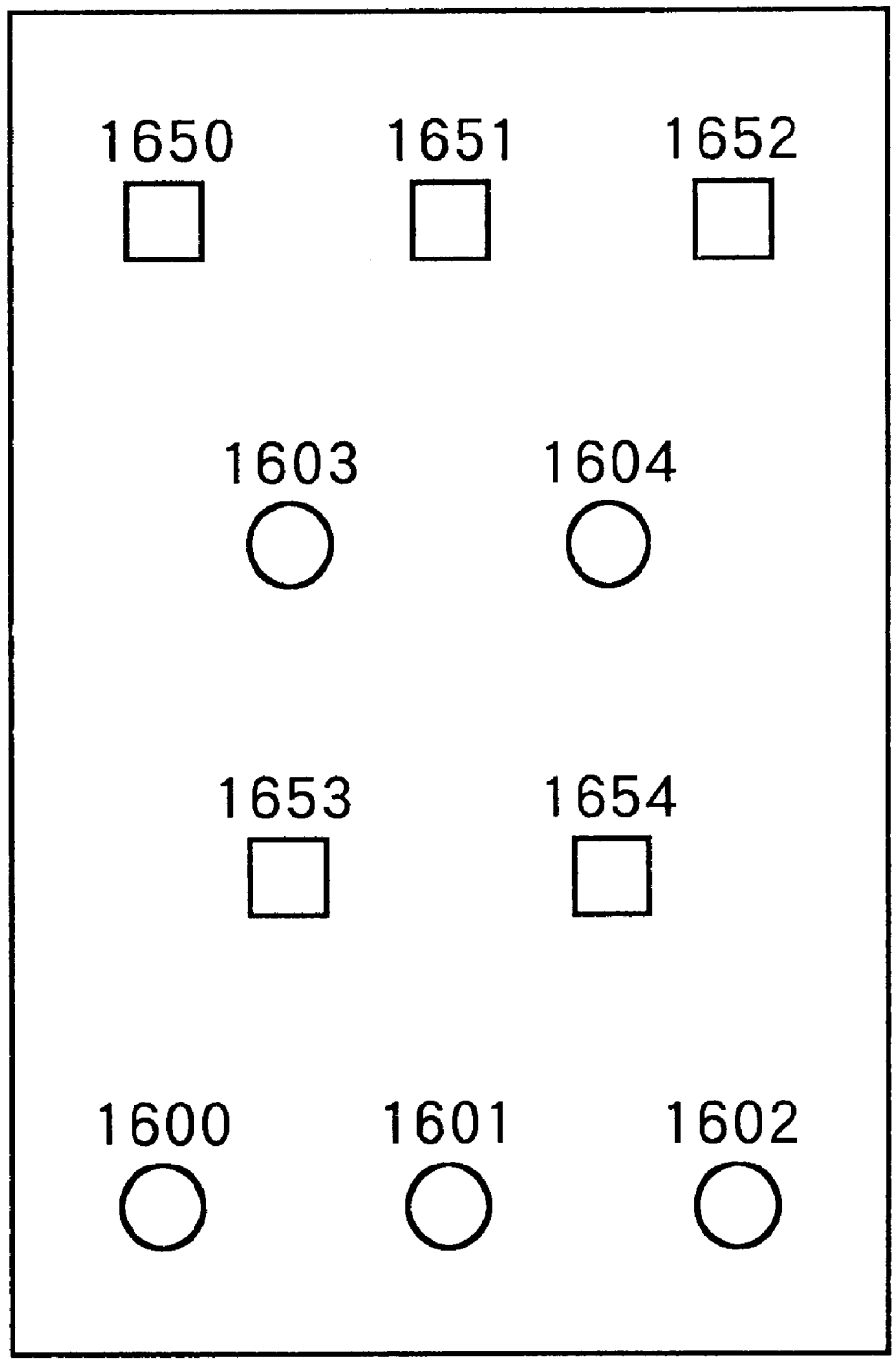
FIG. 5 is a view for explaining the layout of markers set on a table of the game apparatus shown in FIG. 2.

FIG. 5 shows an example of the layout of markers on the table 1000. In FIG. 5, five landmarks, i.e., markers (1600 to 1604) indicated by circular marks are used for helping detect the head position of the player 2000, and five landmarks, i.e., markers (1650 to 1654) indicated by square marks are used for helping detect the head position of the player 3000. When a plurality of markers are arranged, as shown in FIG. 5, the marker seen by the player is determined by the player's head position, especially, the posture. In other words, when the marker sensed by the CCD camera 240 attached to each player is specified to detect the position in the image, the output signal from the magnetic sensor for detecting the head posture of the player can be corrected.

Note that the circular and square marks in FIG. 5 are used for the purpose of illustration, and these marks have no features in their shape but may have any other arbitrary shapes.

The marker groups (1600 to 1604, 1650 to 1654) assigned to the two players (2000, 3000) have different colors. In this embodiment, the markers for the left player (#1 player) are red, and those for the right player (#2 player) are green. Such colors allow easy identification of the markers in the image processing.

It may be proposed to identify markers with the shape and/or texture of them, but not with color thereof.

The feature of this embodiment lies in the use of a plurality of markers. Since a plurality of markers are used, at least one marker always falls within the field of view of the CCD camera 240 as long as the player plays the game on the table 1000 within the operation range of the air hockey game.

Figure 6:
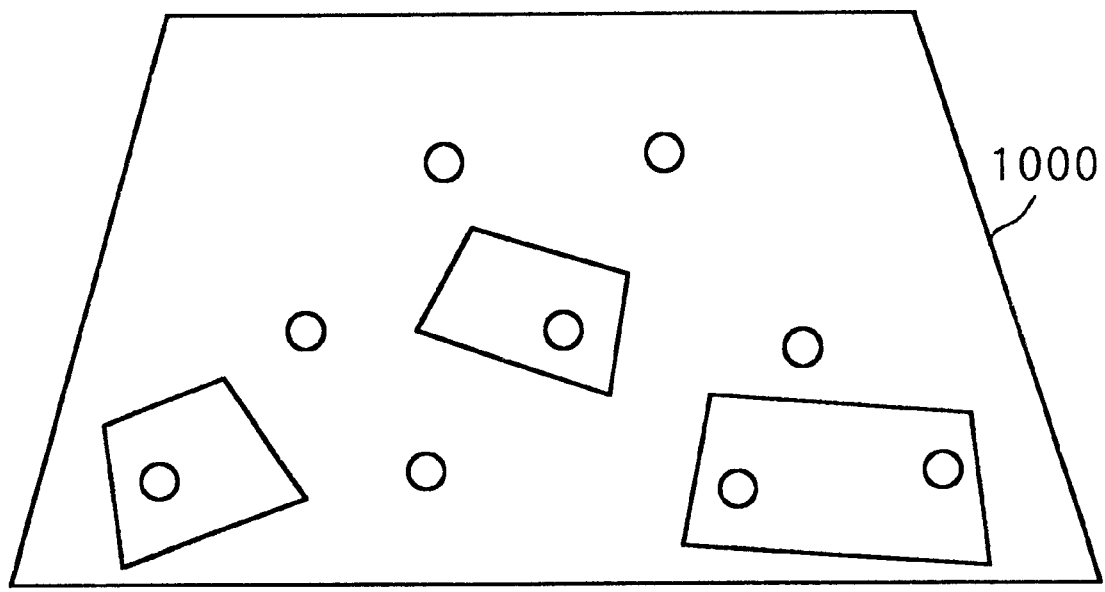
FIG. 6 is a view for explaining transition of markers included in an image captured by a camera attached to the head of the player along with the movement of the player on the table shown in FIG. 5.

FIG. 6 illustrates the moving state of the image processing ranges for detecting the markers as the player variously moves the head. As shown in FIG. 6, one image includes at least one marker. In other words, the number of markers, the interval between adjacent markers, and the like should be set in correspondence with the size of the table 1000, the field angle of the camera 240, and the size of the moving range of each player based on the nature of the game. In the example of FIG. 5, since a broader range falls within the field of view as the markers are farther from the player, the interval between adjacent markers must be increased. This arrangement sets the distance between nearby markers in the image to be equal to that between farther markers, and maintains the number of markers contained within an image of a far area to be low. With such setups, deterioration in precision of the marker detection will be avoided. Thus, both the nearby and farther markers have substantially equal marker densities captured in the image, and too many markers can be prevented from being unwantedly sensed in an frame.

As will be describe later, the embodied game apparatus do not have to a lot of markers, at least one marker that is sensed into images by the camera is enough. The apparatus does not have to keep to track the same marker while the game progresses.

<MR Image Generation System>

Figure 7:
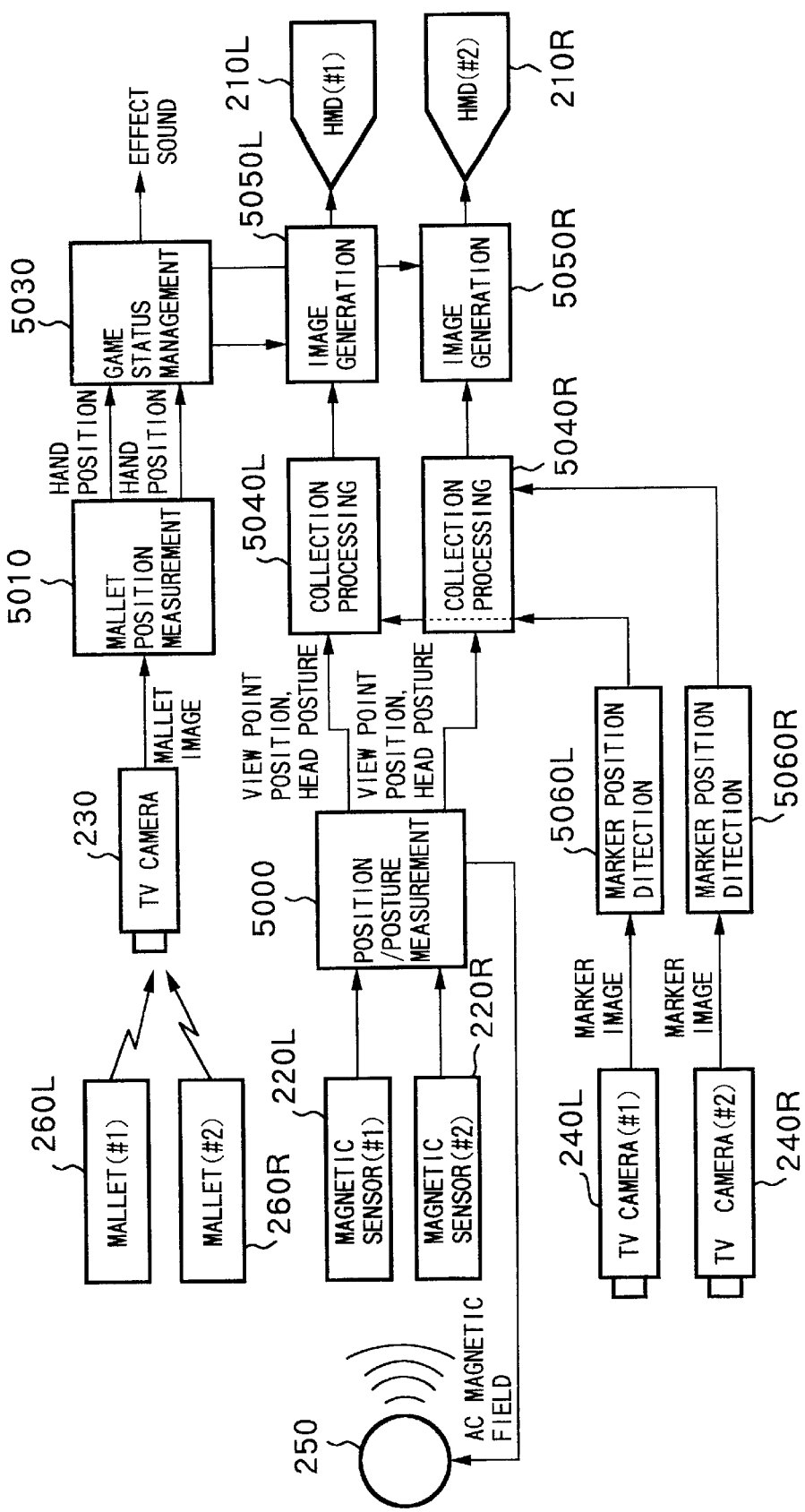
FIG. 7 is a block diagram for explaining the arrangement of a three-dimensional image generation apparatus for the game apparatus of the first embodiment.

FIG. 7 shows a three-dimensional image generation/presentation system in the game apparatus shown in FIG. 2. The image generation/presentation system outputs three-dimensional virtual images (the puck 1500 and goals 1200 in FIG. 3) to the display devices of the HMD 210L of the left player 2000, and the HMD 210R of the right player 3000. Right and left parallax images for three-dimensional virtual images are generated by image generation units 5050L and 5050R. In this embodiment, the image generation unit 5050 used a computer system "Onyx2" available from Silicon Graphics, Inc., U.S.A.

Each image generation unit 5050 receives puck position information generated by a gate status management unit 5030, and information associated with the corrected view point position and head direction generated by two correction processing units 5040L and 5040R. The game status management unit 5030, and correction processing units 5040L and 5040R used the computer systems "Onyx2".

The CCD camera 230 fixed above the center of the table 1000 can capture the entire surface of the table 1000 within its field of view. Mallet information acquired by the camera 230 is input to a mallet position measurement unit 5010. The measurement unit 5010 similarly used a computer system "O2" available from Silicon Graphics, Inc. The measurement unit 5010 detects the mallet positions of the two players, i.e., their hand positions. The information associated with the hand positions is input to the game status management unit 5030, which manages the game state. More specifically, the game state and progress of the game are basically determined by the mallet positions.

A position/posture detection unit 5000 comprising a computer system "O2" available from Silicon Graphics, Inc., detects the view point positions and head postures of the two players (that are, position and posture of the sensor 220 itself) by receiving the outputs from the two magnetic sensors 220L and 220R, detects view points position (X, Y, Z) and posture (p, r, φ) at camera 240 mounted on each player, and then outputs them to the correction processing units 5040L and 5040R.

On the other hand, the CCD cameras 240L and 240R fixed to the heads of the players acquire marker images, which are respectively processed by marker position detection units 5060L and 5060R so as to detect positions of tracked markers falling within the respective fields of view of the individual cameras 240. The information associated with the marker position is input to the correction processing unit 5040 (5040L, 5040R).

Note that marker position detection units 5060 (5060L, 5060R) that track respective markers in respective images sensed by the cameras comprised the computer systems "O2".

<Mallet Position Measurement>

Figure 8:
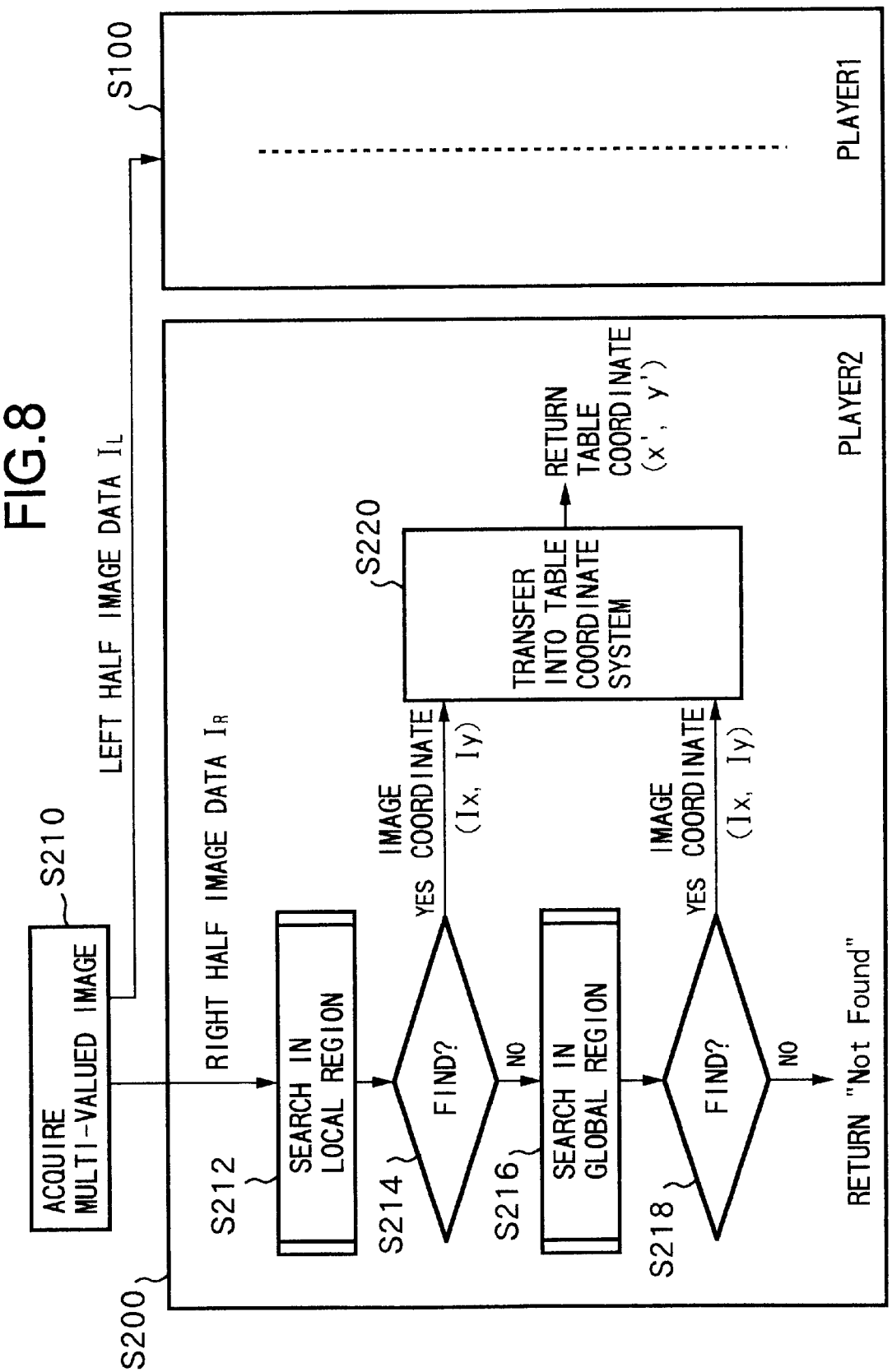
FIG. 8 is a flow chart for explaining the processing sequence by a mallet position measurement unit of the first embodiment.
Figure 9:
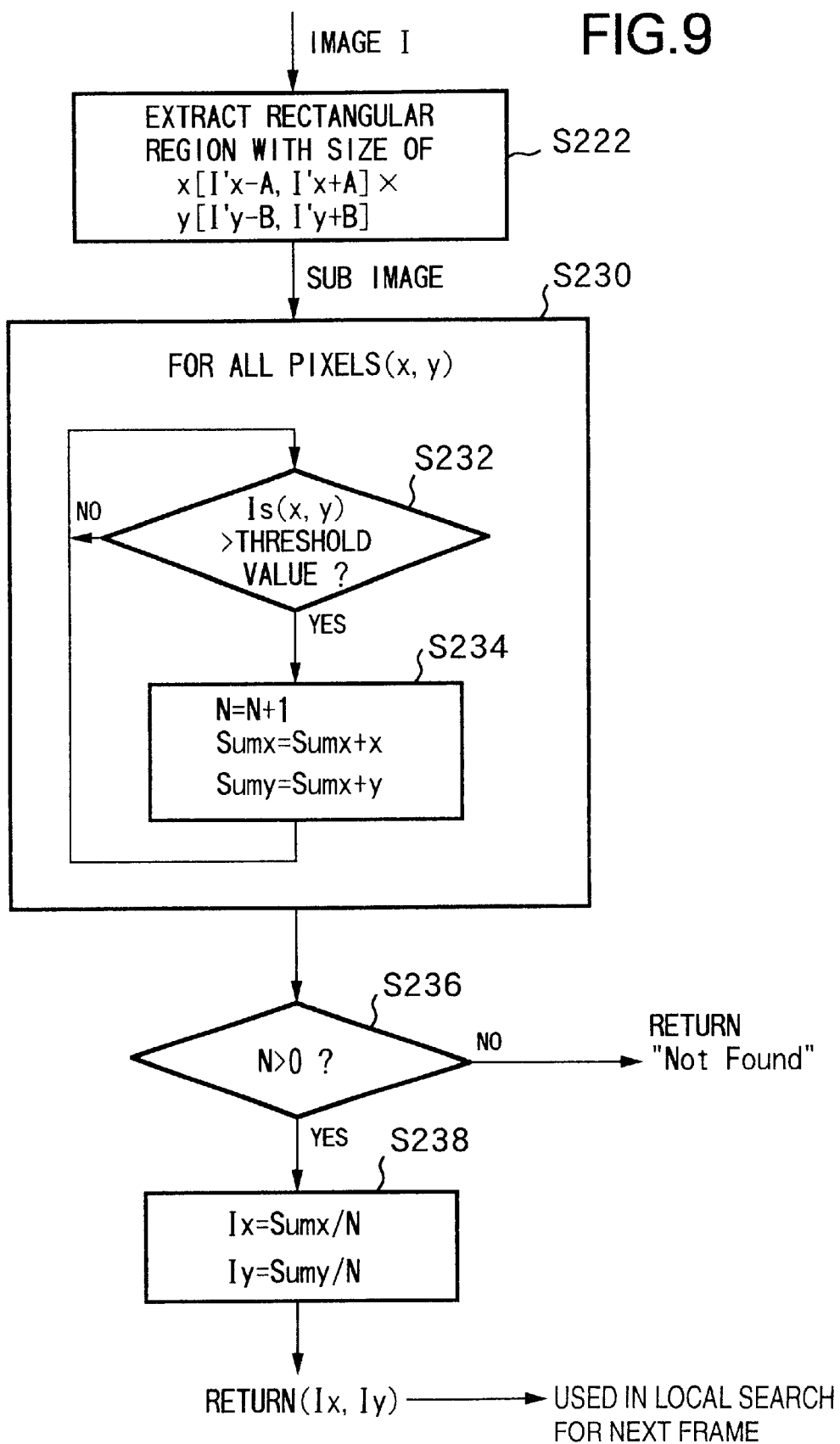
FIG. 9 is a flow chart for explaining a subroutine (local search) of the processing sequence by the mallet position measurement unit of the first embodiment.
Figure 10:
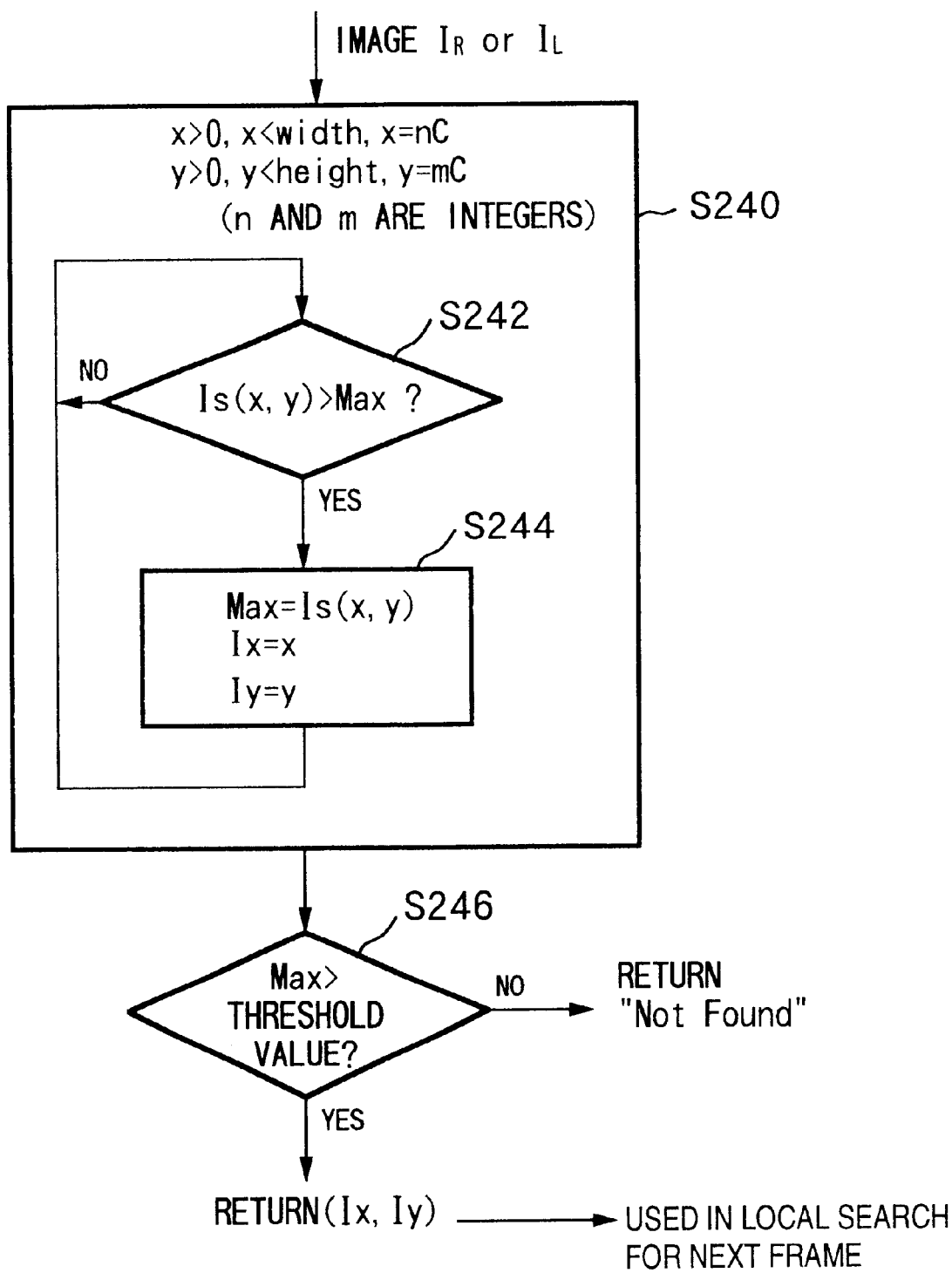
FIG. 10 is a flow chart for explaining a subroutine (global search) of the processing sequence by the mallet position measurement unit of the first embodiment.

FIGS. 8 to 10 are flow charts showing the control sequence for measuring the mallet position. Tracking the mallet positions of the players with the single camera 230 enable to provide a mixed reality space shared by the players. Described will be the measurement of mallet positions according to the embodiment with reference to FIGS. 8–10.

Figure 11:
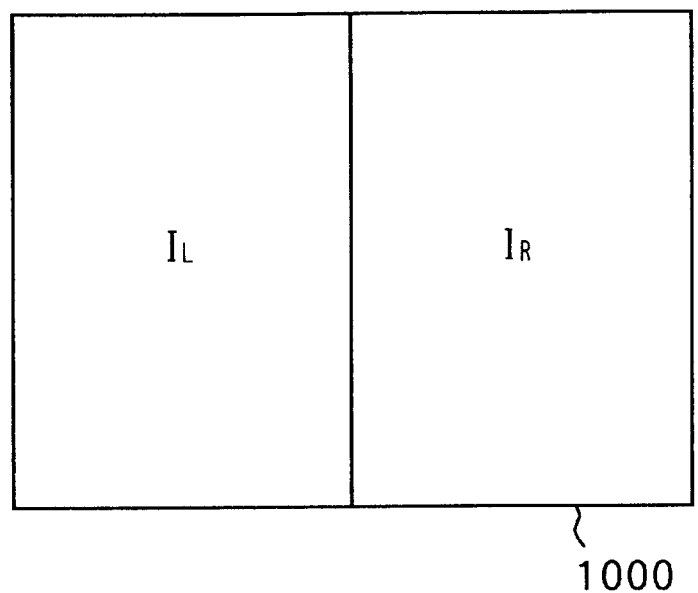
FIG. 11 is a view for explaining segmentation of the regions to be processed used in the processing of the flow chart shown in FIG. 8.

In the air hockey game, each player never moves his or her own mallet to the region of the other player. For this reason, the processing for searching for the mallet 260L (260R) of the left player 2000 (right player 3000) need only be done for image data IL (image data IR) of the left field (right field), as shown in FIG. 11. It is easy to break up the image acquired by the fixed CCD camera 230 into two regions, as shown in FIG. 11.

Hence, in the flow chart shown in FIG. 8, the processing for searching for the mallet 260L of player #1 (player 2000) is done in step S100, and that for searching for the mallet 260R of player #2 (player 3000) is done in step S200.

The search for the mallet of the right player (step S200) will be exemplified below for the sake of simplicity.

In step S210, multi-valued image data of the surface of the table 1000 sensed by the TV camera 230 is acquired. In step S212, the right half image data IR of that multi-valued image data proceeds to a subroutine "search in local region" FIG. 9 shows the "search in local region" processing in detail. If the mallet coordinate position (x, y) on the image coordinate system is found in step S212, the flow advances from step S214 to step S220, and the mallet coordinate position (x, y) on the image coordinate system is transferred into a coordinate position (x', y') on the coordinate system (see FIG. 13) of the table 1000 using:

$$\begin{bmatrix} hx' \\ hy' \\ h \end{bmatrix} = M_T \begin{bmatrix} x \\ y \\ 1 \end{bmatrix} \quad (2)$$

where the matrix $M_T$ is a known 3×3 transformation matrix that attains calibration between the image and table coordinate systems. The coordinate position (x', y') obtained in step S220 (in FIG. 3, the position (x', y') is indicated as the "hand position") is sent to the game status management unit 5030.

If the mallet cannot be found in the local region, a subroutine "search in global region" is executed in step S216. If the mallet is found in the subroutine "search in global region", the obtained coordinate position is transferred into that on the table coordinate system in step S220. Note that the coordinate position obtained from the local or global region is used in a search for the mallet in the local region for the next frame.

FIG. 9 shows the processing for searching for the mallet in the local region (i.e., step S212 in detail). This search processing is done on the right field for the sake of simplicity, but the same applies to the mallet search processing on the left field.

Figure 12:
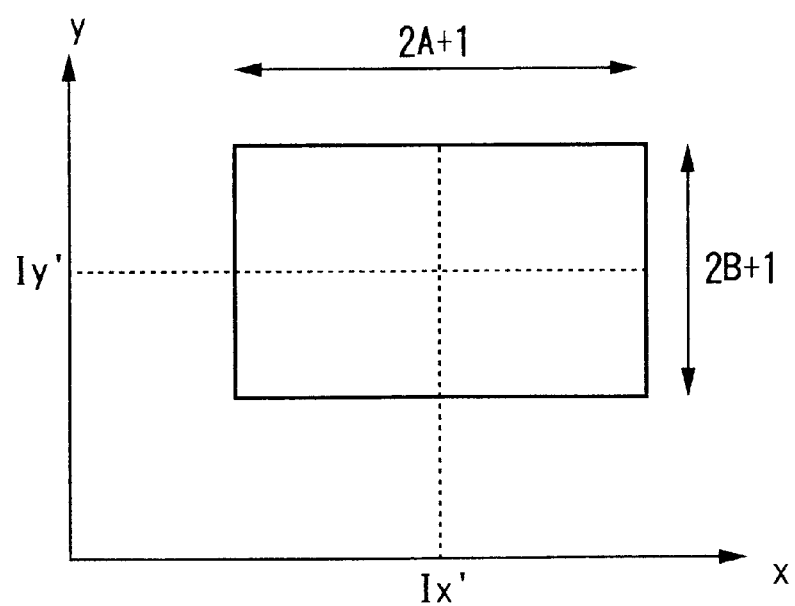
FIG. 12 is a view showing the method of setting the regions to be processed used in the processing of the flow chart shown in FIG. 8.

In step S222, a rectangular region with a size ((2A+1)× (2B+1) pixels) defined by the equations below is extracted:

$$x = [I'_x - A, I'_x + A]$$

$$y = [I'_y - B, I'_y + B] \quad (3)$$

where $I'_x$ and $I'_y$ are coordinate values of the mallet position which was detected in the previous frame, and A and B are constants that determine the size of the search region, as shown in FIG. 12.

In step S230, a pixel, the feature evaluation value $I_s(x, y)$ of which satisfies a given condition, is extracted from all the pixels within the rectangular region defined in step S222. For the purpose of finding the mallet, similarity of a pixel value (infrared ray intensity value) is preferably used as the feature amount. In this embodiment, since the mallet has an infrared ray generator, an object that has a feature of corresponding infrared ray intensity is tentatively determined as a mallet.

More specifically, in step S232, a search for a pixel, the similarity Is of which is equal to or larger than a predetermined threshold value, i.e., is close to that of the mallet, is made. If such pixel is found, a counter N stores the accumulated value of the occurrence frequency. Also, the x- and y-coordinate values of such pixel are cumulatively stored in registers $SUM_x$ and $SUM_y$. That is, $$N = N + 1$$

$$SUM_x = SUM_x + x$$

$$SUM_y = SUM_y + y \quad (4)$$

Upon completion of step S230, the number N of all the pixels similar to the infrared ray pattern coming from the mallet in the region shown in FIG. 12, and the sum values $SUM_x$ and $SUM_y$ of the coordinate values are obtained. If N=0, a result "Not Found" is output in step S236. If N>0, it is determined that an object which is likely to be a mallet is found, and the mallet position is calculated in step S238 by:

$$I_x = \frac{SUM_x}{N}, I_y = \frac{SUM_y}{N} \quad (5)$$

The calculated mallet position $(I_x, I_y)$ is transferred into that on the table coordinate system in step S220 (FIG. 8), and the transferred value is passed to the management unit 5030 as a signal representing the "hand position".

FIG. 10 shows the sequence of the global region search in step S216 in detail.

Figure 15:
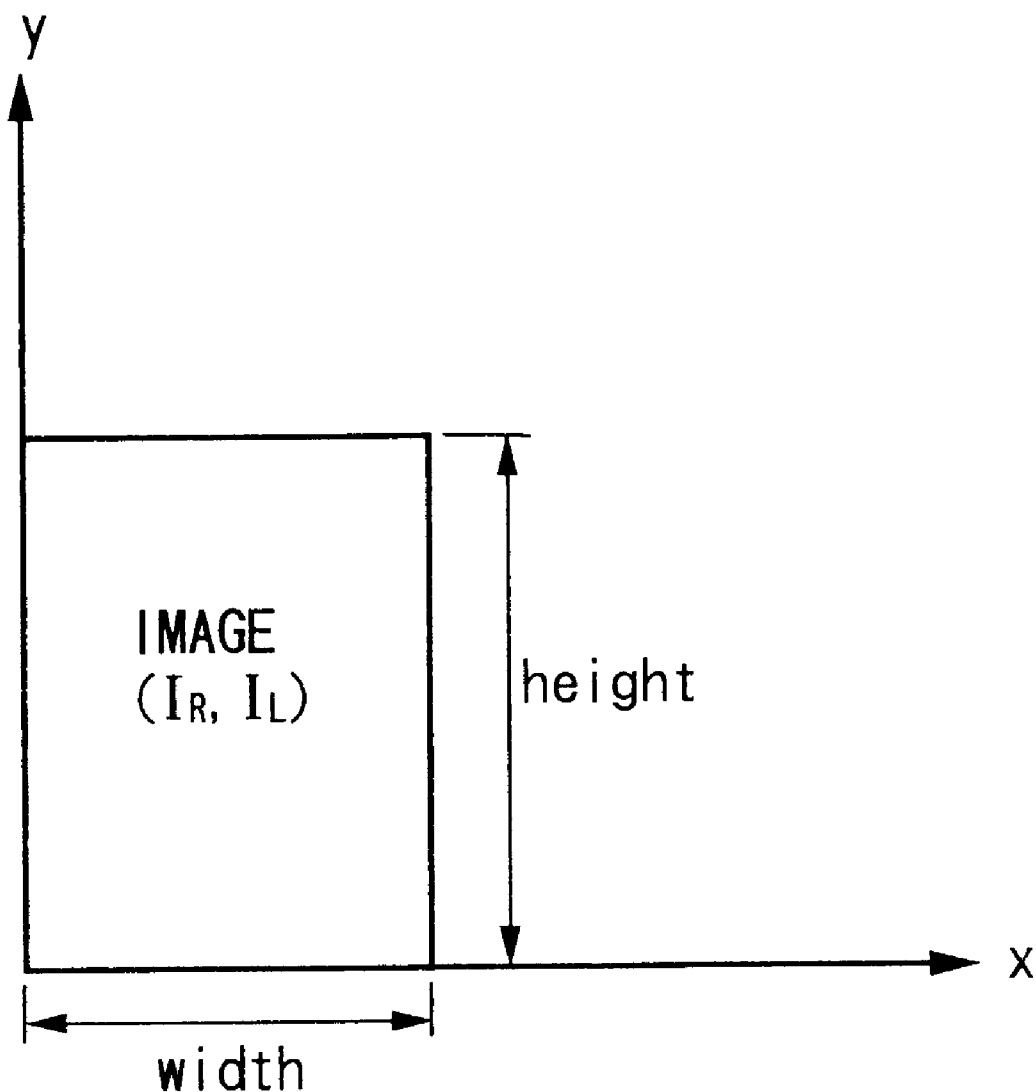
FIG. 15 is a view for explaining a method of detecting a mallet.

In step S240 in FIG. 10, the maximum value of the feature evaluation values $I_S$ among pixels that satisfy:

$$\{(x, y) | x > 0, x < \text{Width}, x = nC,$$

$$y > 0, y < \text{Height}, y = mD \text{ (where } n \text{ and } m \text{ are integers)}\} \quad (6)$$

in the right field image IR is stored in a register Max. Note that C and D are constants that determine the coarseness of the search, and Width and Height are defined, as shown in FIG. 15. That is, it is checked in step S242 if the feature amount $I_S$ exceeds the threshold value stored in the threshold value register Max. If such pixel is found, that feature amount is set as a new threshold value in step S244 by:

$$\text{Max} = I_S(x, y)$$

$$I_x = x$$
$$I_y = y \quad (7)$$

In step S246, the coordinate value ($I_x$, $I_y$) of the pixel which is most likely to be a mallet found in the global search is passed to step S220.

In this manner, the mallet is found from the image, and its coordinate value transferred into that on the table coordinate system is passed to the game status management unit 5030.

<Game Status Management>

Figure 13:
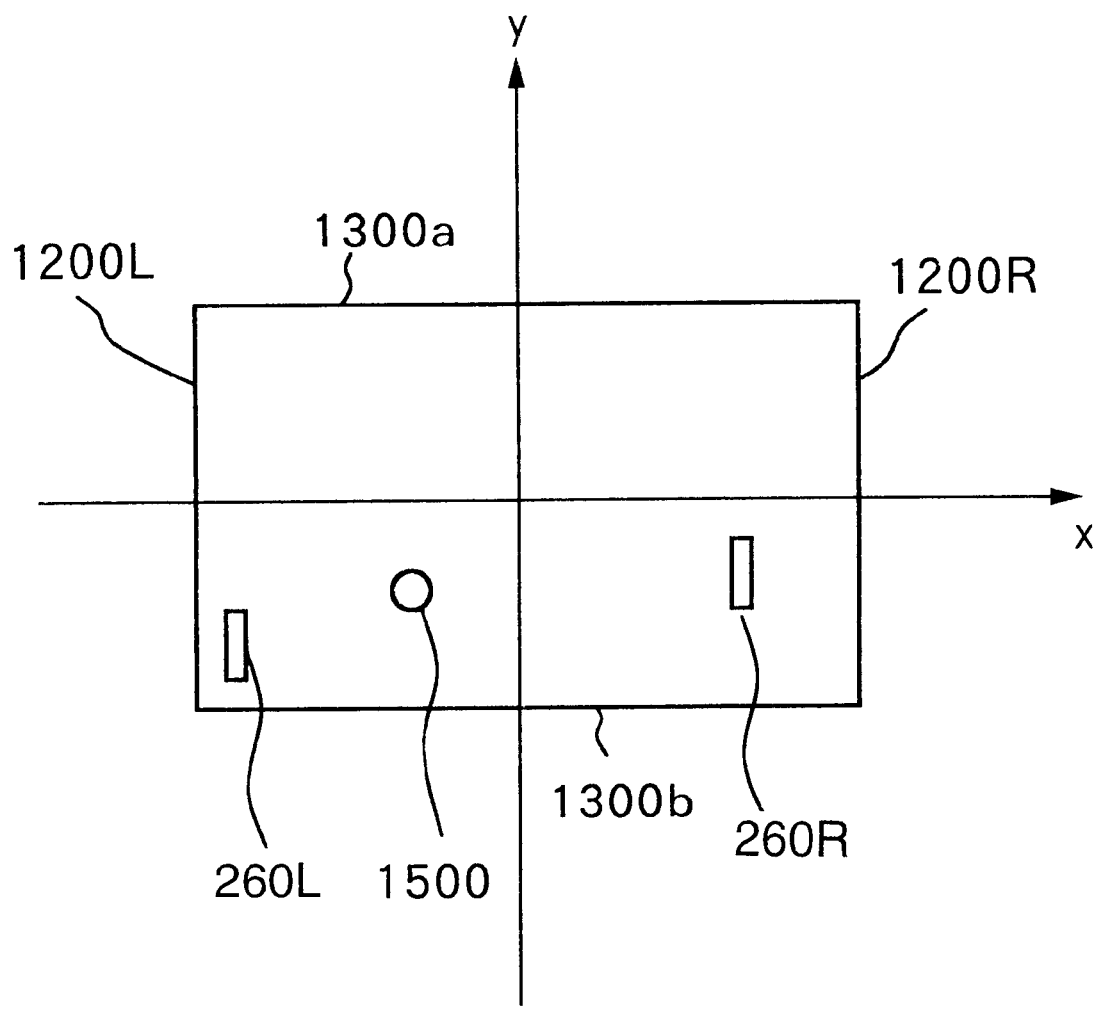
FIG. 13 is a view for explaining a virtual game field in the game of the first embodiment.

FIG. 13 shows the game field of the air hockey game of this embodiment. This field is defined on the two-dimensional plane on the table 1000, and has x- and y-axes. Also, the field has two, right and left virtual goal lines 1200R and 1200L, and virtual walls 1300a and 1300b arranged in the up-and-down direction of FIG. 13. The coordinate values of the virtual goal lines 1200R and 1200L and virtual walls 1300a and 1300b are known, and never move. On this field, the virtual image of the puck 1500 moves in correspondence with the movements of the mallets 260R and 260L.

The puck 1500 has coordinate information $P_P$ and velocity information $v_P$ at the present position, the left mallet 260L has coordinate information $P_{SL}$ and $V_{SL}$ at the present position, and the right mallet 260R has coordinate information $P_{SR}$ and $V_{SR}$ at the present position.

Figure 14:
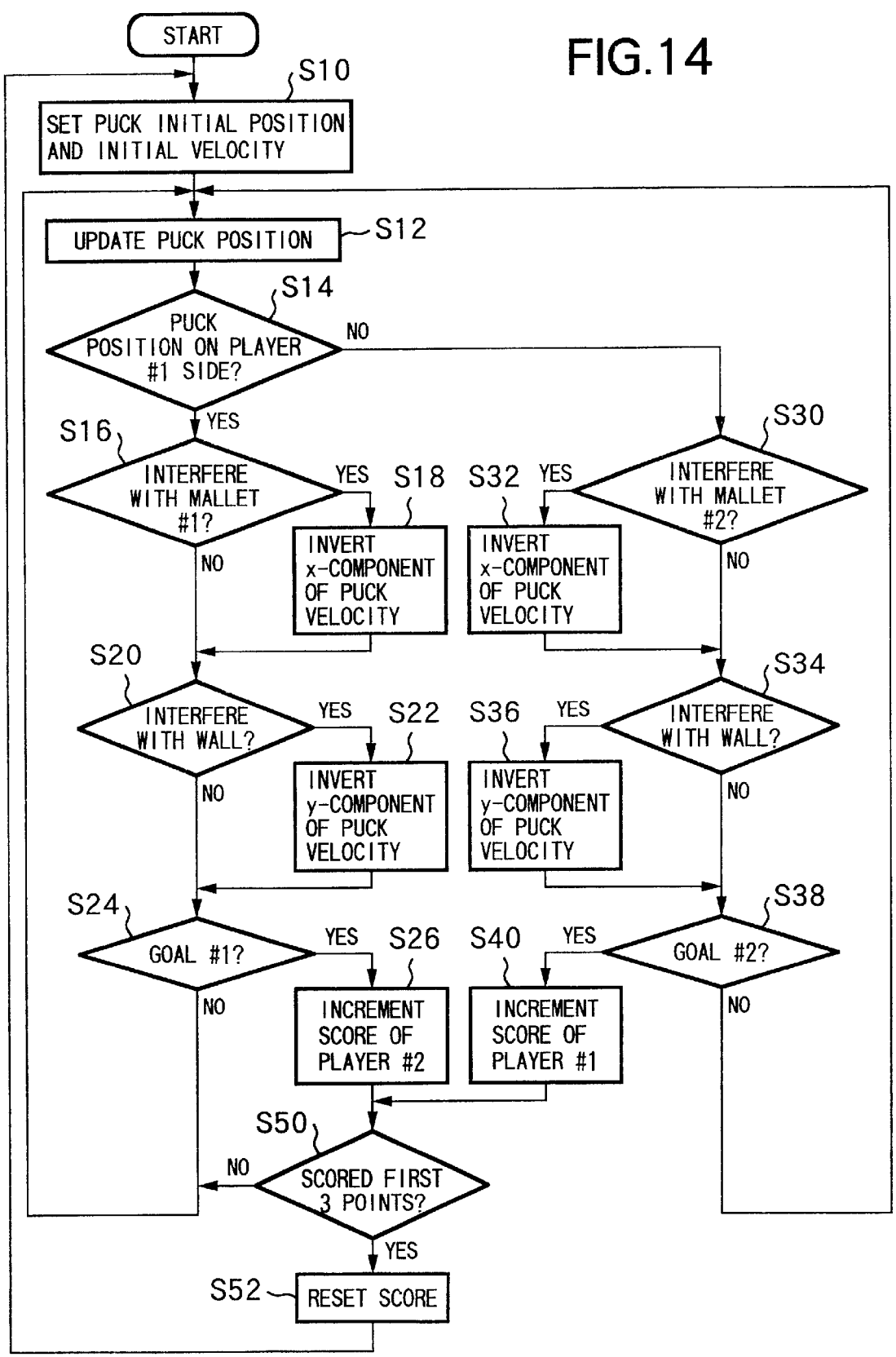
FIG. 14 is a flow chart for explaining the control sequence of game management in a game status management unit of the first embodiment.

FIG. 14 is a flow chart for explaining the processing sequence in the game status management unit 5030.

In step S10, the initial position $P_{P0}$ and initial velocity $v_{P0}$ of the puck 1500 are set.

Note that the puck moves at an equal velocity $v_P$. Also, the puck undergoes perfect elastic collision when it collides against a wall or the mullets, i.e., its velocity/direction is reversed.

The game status management unit 5030 obtains velocity information $v_S$ from the mallet position information $P_S$ measured by the mallet position measurement unit 5010.

Step S12 is executed at Dt time intervals until either player of the game wins (it is determined in step S50 that one player has scored first 3 points of the game).

In step S12, the puck position is updated to:

$$P_P = P_{P0} + v_{P0} \cdot Dt \quad (8)$$

After the initial position and initial velocity are set, the puck position is generally given by:

$$P_P = P_P + v_P \cdot Dt \quad (9)$$

In step S14, it is checked if the updated puck position $P_P$ is located within the field of player #1 (left player). A case will be explained below wherein the puck 1500 is located on the left player side.

It is checked in step S16 if the current puck position interferes with the mullet 1100L. If it is determined that the puck 1500 is located at a position where the puck interferes with the mullet 1100L, since this means that the left player 2000 has moved the mallet 260L to hit the puck, the sign of the x-velocity component of the velocity $v_{Px}$ of the puck 1500 is inverted in step S18 so as to reverse the motion of the puck 1500, and the flow advances to step S20.

Note that in place of simply inverting the sign of the x-velocity component $v_{Px}$ of the velocity, the puck may be controlled to move in the opposite direction by adding the manipulation velocity $v_{SLx}$ of the mullet to the x-direction velocity $v_{Px}$ of the puck by calculating:

$$v_{Px} = -v_{Px} + v_{SLx} \quad (10)$$

On the other hand, if the present puck position does not interfere with the mullet 1000L of the left player (NO in step S16), the flow directly advances to step S20.

It is checked in step S20 if the puck position $P_{i+1}$ interferes with the virtual wall 1300a or 1300b. If YES in step S20, the y-component of the pack velocity is inverted in step S22.

It is then checked in step S24 if the present puck position is within the goal line of the left player. If YES in step S24, the score of the opponent player, i.e., right (#2) player is incremented in step S26. It is checked in step S50 if either player has scored first 3 points. If YES in step S50, the game ends.

If it is determined in step S14 that the puck position $P_P$ is located on the right player side (#2 player side), step S30 and the subsequent steps are executed. The operations in steps S30 to S40 are substantially the same as those in steps S16 to S26.

In this manner, the game progress state is managed. The game progress state is determined by the puck and mullet positions, which are input to the image generation unit 5050 (5050L, 5050R), as described above.

<Correction of Head Position>

Figure 16:
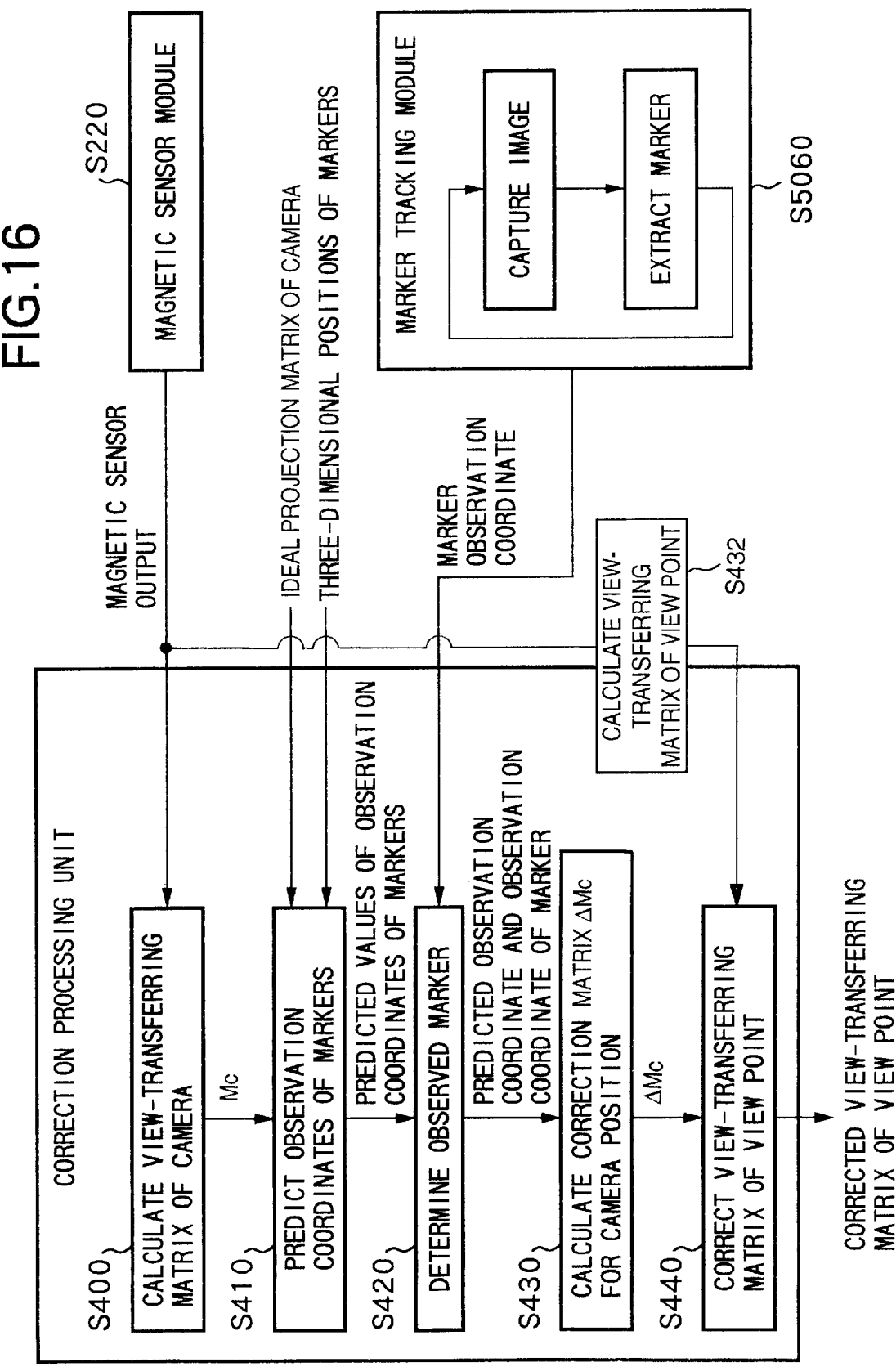
FIG. 16 is a flow chart for explaining the overall processing sequence of a correction processing unit in the first embodiment.

FIG. 16 shows the overall control sequence of the processing in the correction processing unit 5040 (5040L, 5040R). The correction processing unit 5040 corrects view point position data and head posture data, which are calculated by the measurement unit 5000 based on the output from the magnetic sensor 220, which output normally includes errors, on the basis of the marker position in the image obtained from the CCD camera 240. That is, in this correction, the correction value of the position of the camera 240 (which is closely related to the head position) is calculated from the marker position in the image captured by the camera 240, and the view-transferring matrix of the view point is corrected using the correction value. The corrected view-transferring matrix represents the corrected view point position and head posture. In other words, the corrected matrix will provide a virtual image at the corrected view point.

Figure 26:
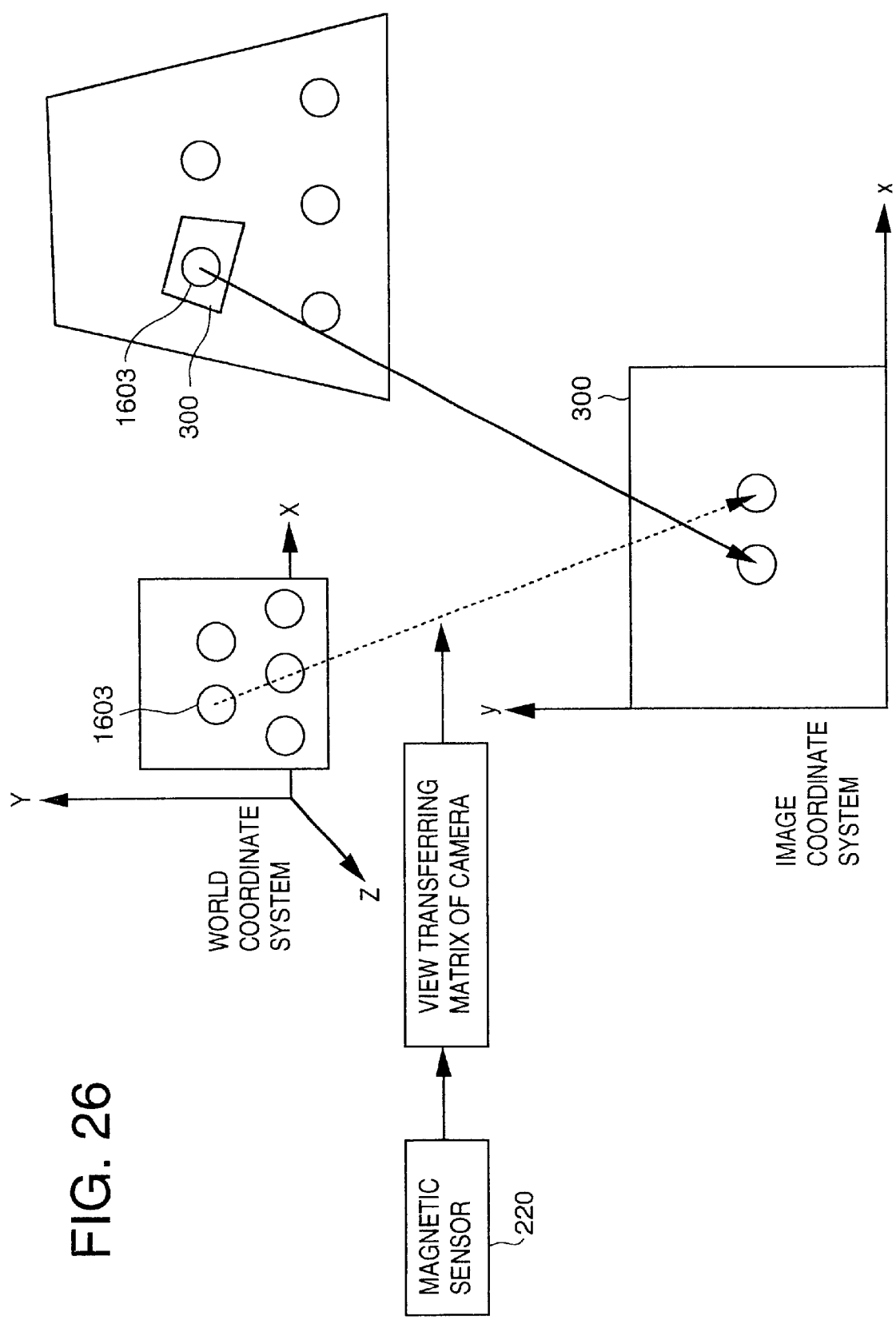
FIG. 26 explains the principle of the correction process adopted in the first embodiment.

FIG. 26 illustrates the principle of correcting view position and posture of the players according to the first embodiment, where the correction process is equivalent with obtaining a corrected view-transferring matrix.

Referring to FIG. 26, the camera 240 of the player has just been sensing a marker 1603 into a picked-up image 300. The position of the marker 1603 is represented by ($x_0$, $y_0$) in the image coordinate system with respect to the image 300. The position of the marker 1603 in the world coordinate system is represented by ($X_0$, $Y_0$, $Z_0$), which is known. Since ($x_0$, $y_0$) is an image-coordinate value while ($X_0$, $Y_0$, $Z_0$) is a world coordinate value, they cannot be compared. The first embodiment calculates a view-transferring matrix of the camera 240 on the basis of the output of the magnetic sensor 220, and then transfers the world coordinate value ($X_0$, $Y_0$, $Z_0$) into an image-coordinate value ($x'_0$, $y'_0$). On the basis of the fact that difference between coordinate values, ($x_0$, $y_0$) and ($x'_0$, $y'_0$), implies an error in the outputs of the sensor 220, a correction matrix $\Delta M_C$ for correcting the difference, which will be described later.

Apparently from FIG. 26, the apparatus according to the first embodiment has to identify or discriminates the marker 1603 from among the other markers within the image 300. The identification or discrimination is made in such a manner that (known) three-dimensional world-coordinate values of all the markers are converted into image-coordinate values by means of the view-transferring matrix $M_C$, and that the marker is identified or discriminated to be a marker the image-coordinate value of that is the closest to ($x_0$, $Y_0$). The process associated with the identification will be described with reference to FIGS. 19 and 20.

The process made by the correction processing unit 5040 will be described below with reference to FIG. 16.

In step S400, a view-transferring matrix (4×4) of the camera 240 is calculated on the basis of the output from the magnetic sensor 220. In step S410, the coordinate position where each marker is to be observed in the image coordinate system is predicted on the basis of the view-transferring matrix obtained in step S400, an ideal projection matrix (known) of the camera 240 and the three-dimensional position (known) of each marker.

On the other hand, the marker position detection unit 5060 (5060L, 5060R) tracks the marker in the image obtained from the camera 240 (240L, 240R) attached to the head of the player. The marker position detection unit 5060 passes the detected marker position to the correction processing unit 5040 (in step S420). The correction processing unit 5040 (5040L, 5040R) determines the marker observed presently, i.e., a reference marker in correction, on the basis of the passed marker position information in step S420. In step S430, the correction processing unit 5040 calculates a correction matrix $\Delta M_C$ that corrects the position/posture the camera 240 the magnetic sensor 220 has detected, on the basis of a difference between the prediction coordinate value of the marker calculated in step 410 and the observed coordinate value of the marker (marker 1603 in the example of FIG. 26) detected by the detection unit 5060. The coordinate value of the marker measured by the detection unit 5060 would match the coordinate value of the marker on the basis of the head position detected by the sensor 240 as long as outputs of the sensor be correct. Therefore, the difference calculated in step S430 represents a error of the sensor 240. This enables to correct the position/posture of the camera, as described above. The positions and postures of the camera and the view point have a known relationship which is represented by a three-dimensional coordinate transfer. Thus, in step S440, the view-transferring matrix of the view point calculated in step S432 is corrected on the basis of the $\Delta M_C$ for correcting the position/posture of the camera. The unit 5040 then passes the corrected transferring matrix to the image generation unit 5050 (5050L, 5050R).

Figure 17:
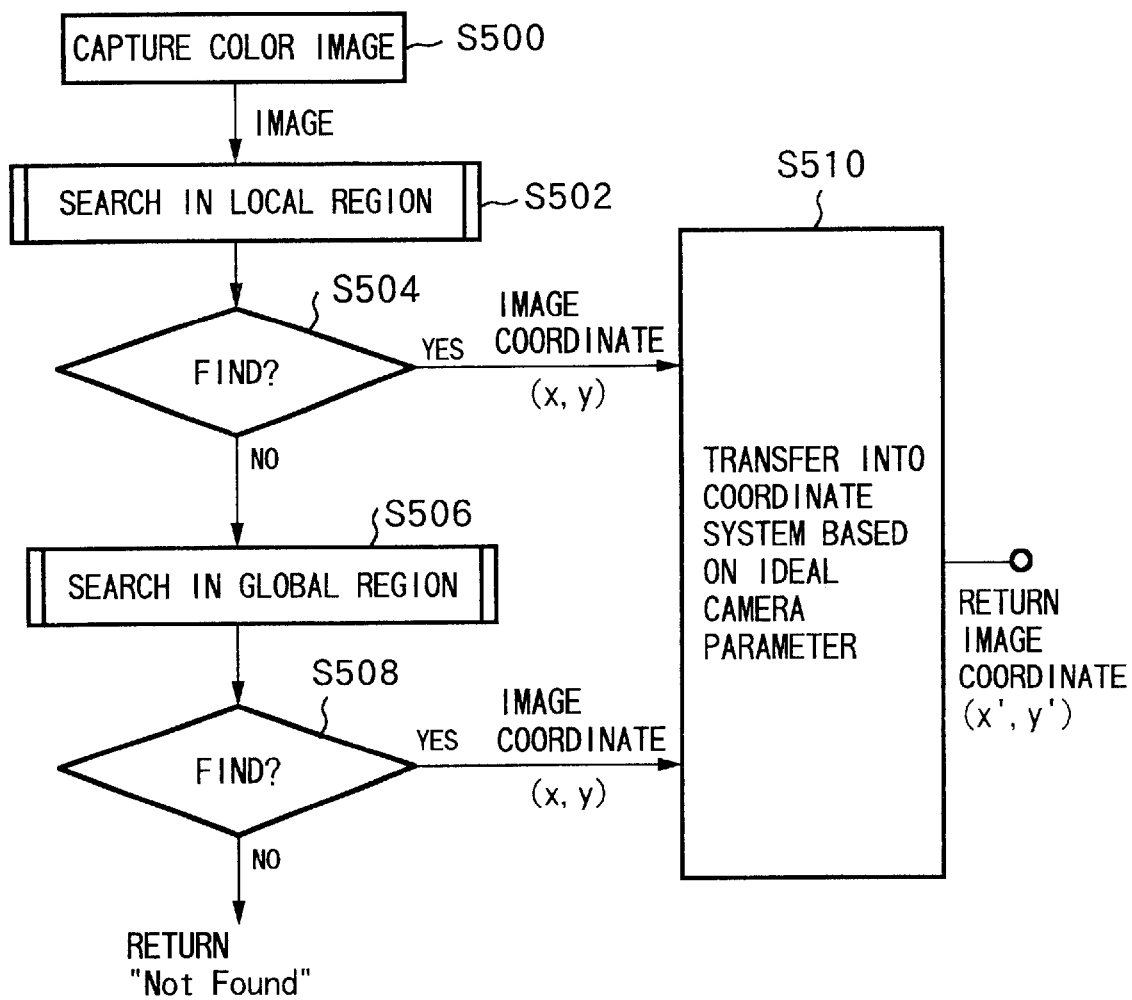
FIG. 17 is a flow chart for explaining some steps (marker tracking) in the flow chart shown in FIG. 16 in detail.

FIG. 17 shows the processing sequence for detecting marker positions, performed in the marker position detection unit 5060.

In step S500, a color image captured by the camera 240 is received.

After that, a "local region search" and "global region search" are respectively executed in steps S502 and S506 to detect the marker position (x, y) expressed by the image coordinate system. Since the "local region search" in step S502 and "global region search" in step S506 are substantially the same as the "local region search" (FIG. 9) and "global region search" (FIG. 10) in a mallet search, the descriptions of the above-mentioned search sequences are quoted, and a detailed description thereof will be omitted. However, for player #1 (left), the feature amount $I_S$ for a marker search in the quoted control sequence (step S232) uses the pixel value of the pixel of interest:

$$\frac{R}{(G+B)/2} \quad (11)$$

Since red markers (1600 to 1604) are used for player #1, this feature amount expresses the reddish degree. Also, since green markers (1650 to 1654) are used for player #2 (right), the feature amount uses:

$$\frac{G}{(R+B)/2} \quad (12)$$

Also, these two amounts are used as the feature amount $I_S$ in a global search.

The marker coordinate value obtained in step S502 or S506 is transferred into that on an ideal image coordinate system free from any distortion using a matrix M (having a size of, e.g., 3×3) for correcting distortion in step S510. The transferring formula used at that time is:

$$\begin{bmatrix} hx' \\ hy' \\ h \end{bmatrix} = M \cdot \begin{bmatrix} x \\ y \\ 1 \end{bmatrix} \quad (13)$$

The processing in step S410 in FIG. 16 will be explained in detail below with reference to FIG. 18.

As described above, a transferring matrix $M_C$ (4×4 view-transferring matrix) from a world coordinate system into the camera coordinate system is obtained in step S400. On the other hand, a transferring matrix $P_C$ (4×4) from the camera coordinate system into the image coordinate system is also given as a known value. Also, the three-dimensional coordinate position (X, Y, Z) of the marker of interest is given as a known value.

Specifically, if an angle r represents the rotation (roll) in the Z-axis direction at the position of the camera 240, an angle p represents the rotation (pitch) in the X-axis direction at the position of the camera 240, and an angle φ represents the rotation (yaw) in the Z-axis direction at the position of the camera 240, ($X_0$, $Y_0$, $Z_0$) represents a position of the camera 240, the view-transferring matrix $M_C$ of the camera 240, that is a matrix for performing a transfer from the world coordinate system to the camera coordinate system, is given by:

$$M_C = \begin{bmatrix} \cos r & -\sin r & 0 & 0 \\ \sin r & \cos r & 0 & 0 \\ 0 & 0 & 1 & 0 \\ 0 & 0 & 0 & 1 \end{bmatrix} \begin{bmatrix} 1 & 0 & 0 & 0 \\ 0 & \cos p & -\sin p & 0 \\ 0 & \sin p & \cos p & 0 \\ 0 & 0 & 0 & 1 \end{bmatrix} \cdot \quad (14)$$

$$\begin{bmatrix} \cos\phi & 0 & \sin\phi & 0 \\ 0 & 1 & 0 & 0 \\ -\sin\phi & 0 & \cos\phi & 0 \\ 0 & 0 & 0 & 1 \end{bmatrix} \begin{bmatrix} 1 & 0 & 0 & -X_0 \\ 0 & 1 & 0 & -Y \\ 0 & 0 & 1 & -Z_0 \\ 0 & 0 & 0 & 1 \end{bmatrix}$$

Let d be the focal length of the camera 240, w be the width of the imaging surface of the camera, and h be the height of the imaging surface. Then, a matrix PC for converting camera-coordinate values to the image coordinate system is given by:

$$P_C = \begin{bmatrix} d/w & 0 & 0 & 0 \\ 0 & d/h & 0 & 0 \\ 0 & 0 & -1 & 0 \\ 0 & 0 & -1 & 0 \end{bmatrix} \quad (15)$$

Figure 18:
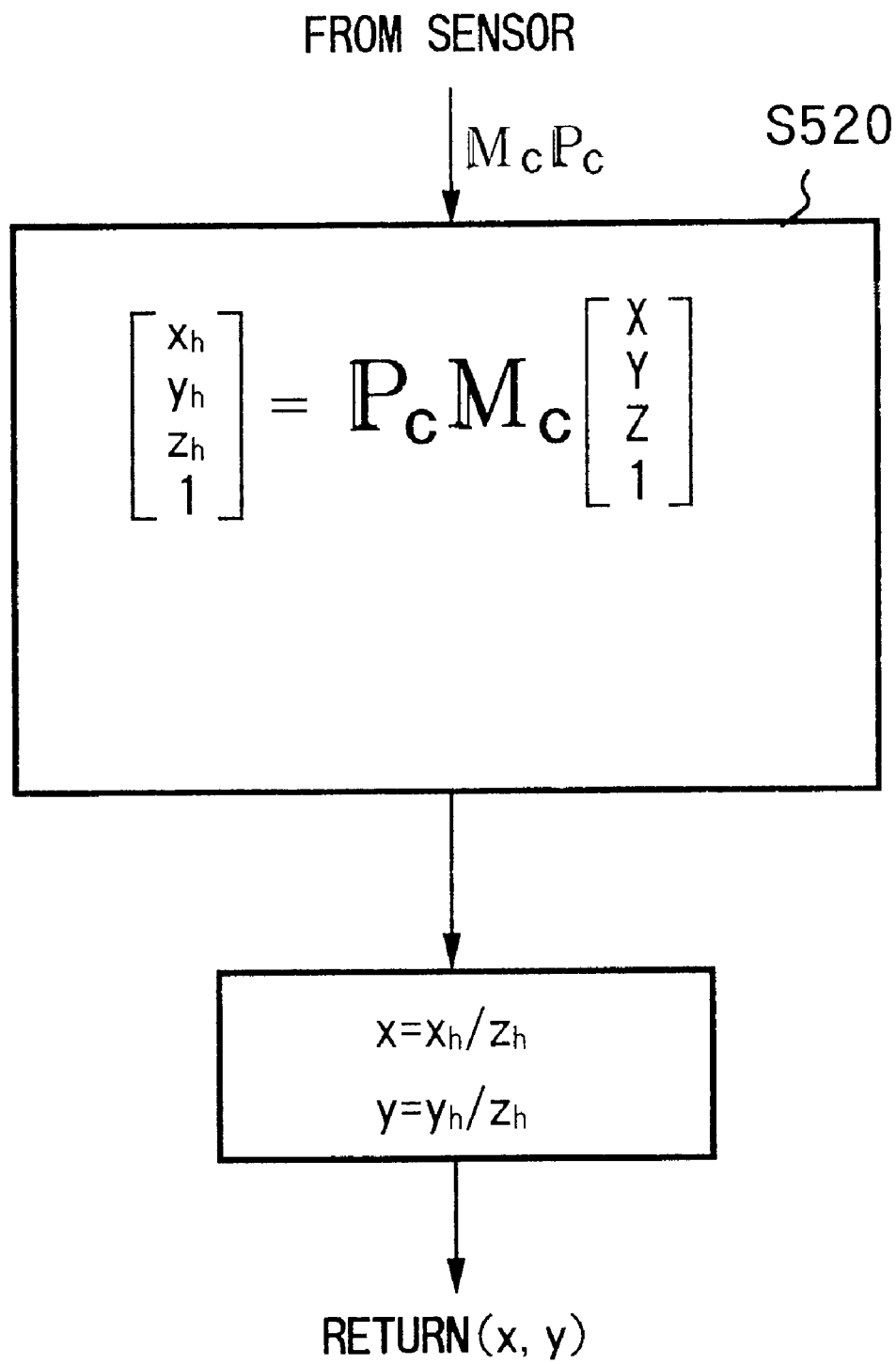
FIG. 18 is a flow chart for explaining some steps (marker position prediction) in the flow chart shown in FIG. 16 in detail.

Consequently, in step S520 of FIG. 18 (corresponding to the step S410 of FIG. 16), the coordinate position (X, Y, Z) of the marker of interest is transferred into that ($x_h$, $y_h$, $z_h$) on the image plane using:

$$\begin{bmatrix} x_h \\ y_h \\ z_h \\ 1 \end{bmatrix} = Pc \cdot Mc \begin{bmatrix} X \\ Y \\ Z \\ 1 \end{bmatrix} \quad (16)$$

In step S522, the predicted coordinate value (x, y) of the marker in the image coordinate system is obtained by:

$$x = \frac{x_h}{z_h} \quad (17)$$

$$y = \frac{y_h}{z_h}$$

Thus, through step S410, given are predicted image-coordinate values $(x_i, y_i)$ of the markers i.

Figure 19:
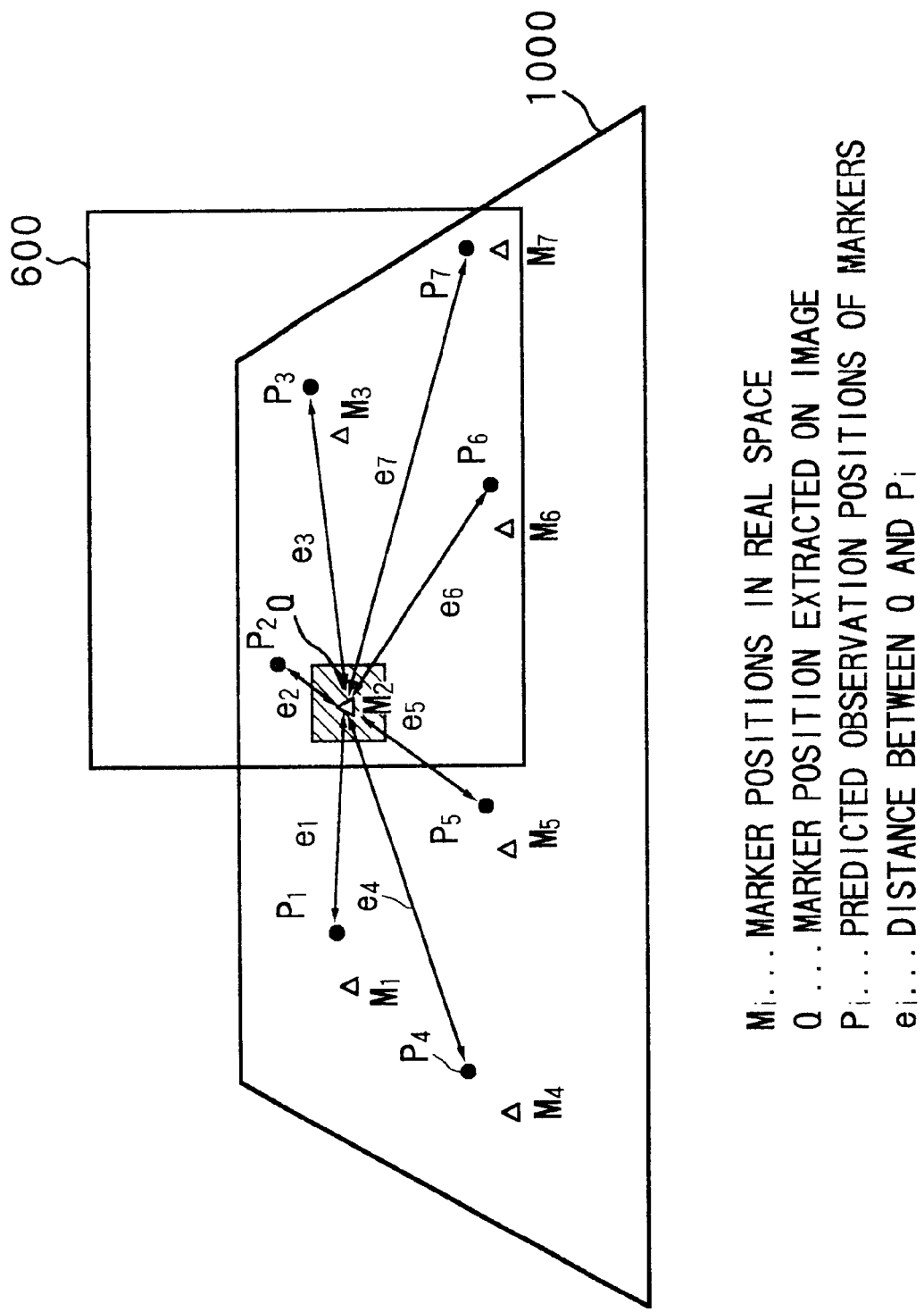
FIG. 19 is a view for explaining the principle of detection of a reference marker used in correction.

The "marker determination" in step S420 will be explained below. FIG. 19 shows the case wherein the camera 240 of one player has captured an image 600 on the table 1000.

For example, let $M_1$ to $M_7$ be the markers arranged on the table 1000, as indicated by triangular marks. The three-dimensional position $M_i$ of each marker is known. The image 600 includes the markers $M_2$, $M_3$, $M_6$, and $M_7$. On the other hand, the predicted observation position of each marker $M_i$ is the one calculated in step S520, and is expressed by $P_i$. Also, Q represents the marker position, which is detected by and passed from the marker position detection unit 5060.

The "marker determination" in step S420 determines Pi (i.e., $M_i$) to which the marker position Q detected by the marker position detection unit 5060 corresponds. In FIG. 19, assume that a vector $e_i$ represents the length, i.e., distance of a vector extending from the detected marker position Q to the predicted position $P_i$ of each marker.

Figure 20:
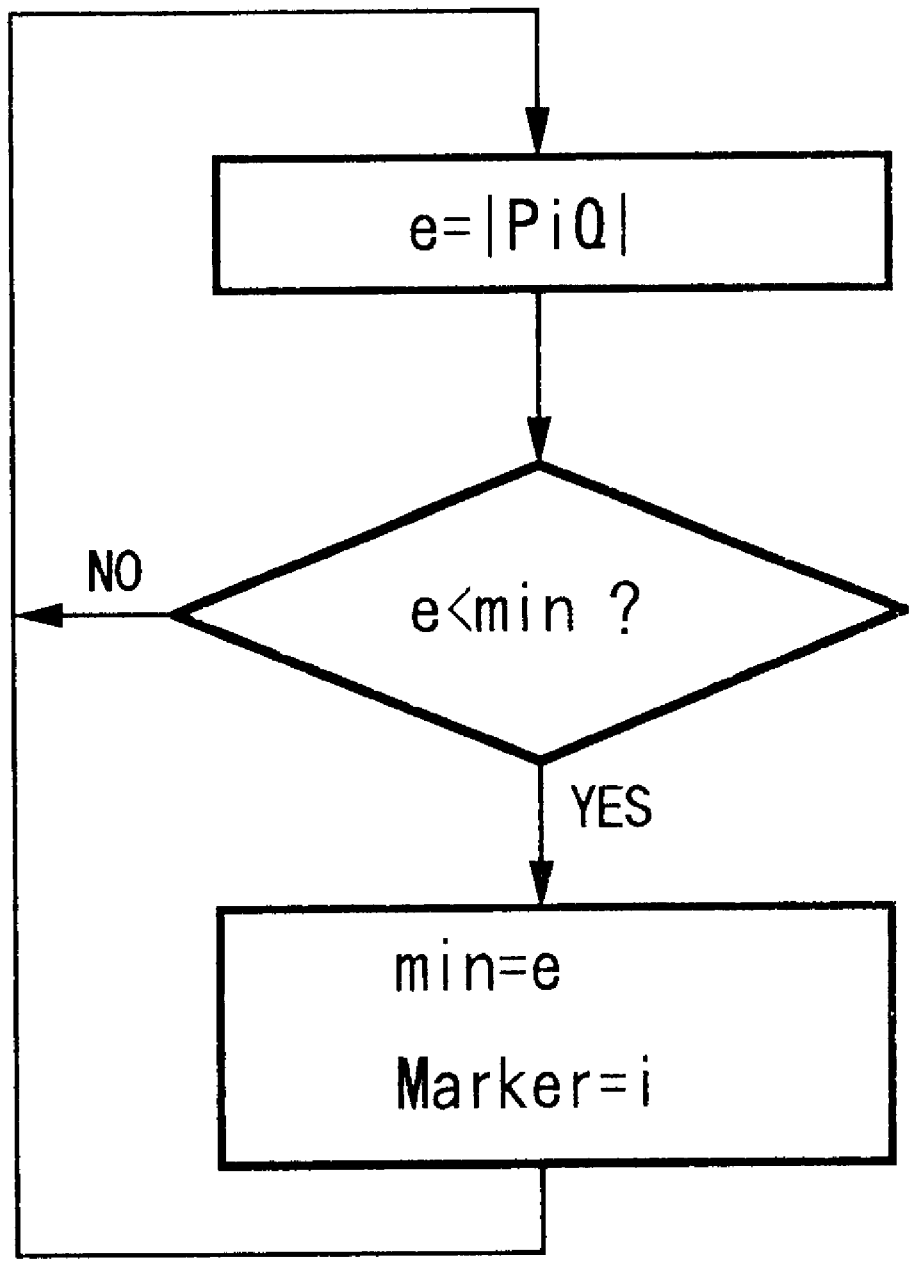
FIG. 20 is a flow chart for explaining the principle of detection of a reference marker.

FIG. 20 shows the contents of step S420 in detail. That is, the processing in FIG. 20 extracts a marker that yields a minimum value from the distances $e_i$ of markers i (i=0 to n) included in the image 600, and outputs the identifier i of that marker. That is, $$i: \text{Min}\{e_i\} \quad (18)$$

In the example shown in FIG. 19, since the distance $e_2$ from $P_2$ is the shortest, the marker $M_2$ is used as data for correcting the magnetic sensor output.

As described above, since the camera 240 can capture at least one marker within the activation range (field) of the player independently of the movement of the player, the field need not be narrowed down unlike in the prior art.

Figure 1:
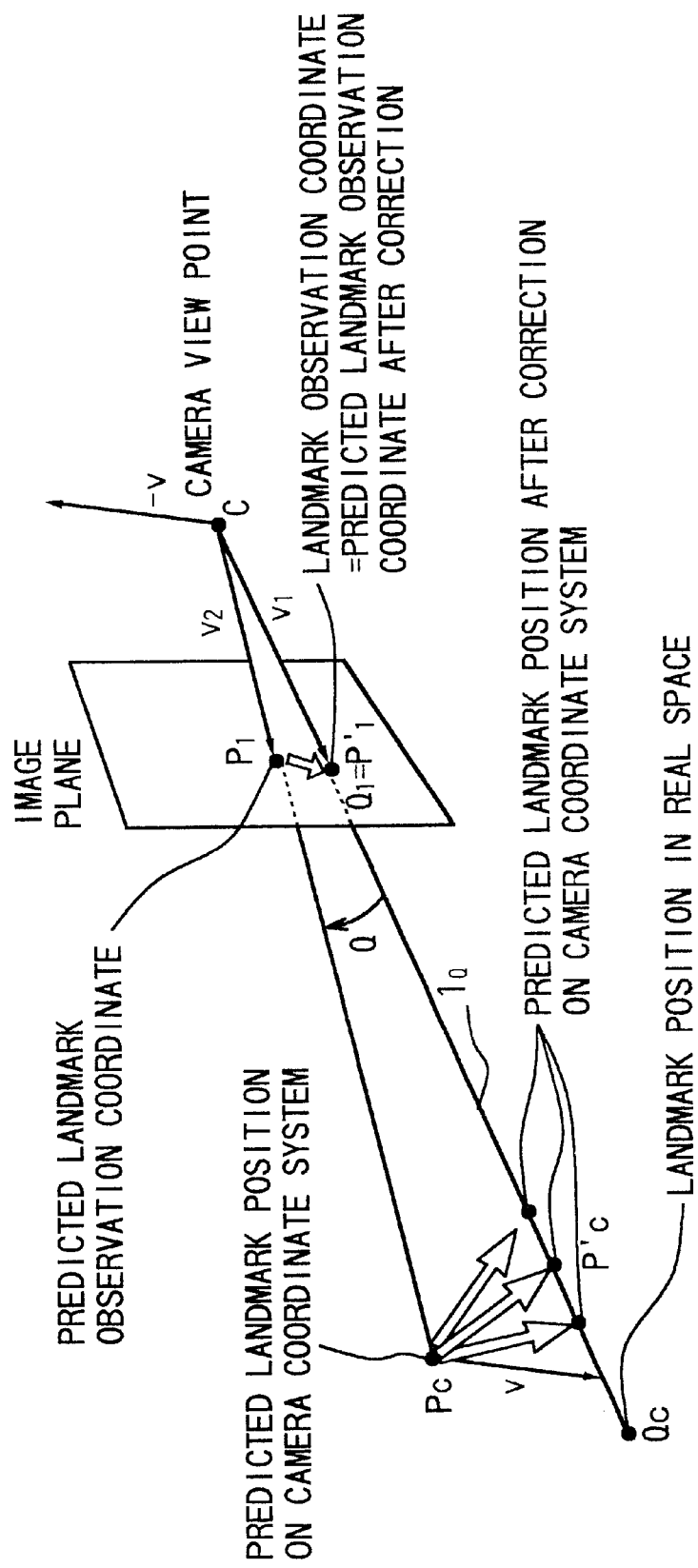
FIG. 1 is a view for explaining the principle of camera position correction, which is applied to the prior art and an embodiment of the present invention.

The processing operations in step S430, which is the same as that described above with reference to FIG. 1, calculates the transfer matrix $\Delta M_C$ for correcting the position and posture of the camera on the basis of error distance $e_{min}$ and the direction thereof obtained through the equation 18.

In step S432 executed parallely with the steps, the view-transferring matrix at the view position of players is calculated on the basis the outputs of the sensor 220. Then, letting $M_{VC}$ denote a transfer matrix (which is known) from the camera-coordinate system to the view-coordinate system, calculated is a view-transferring matrix $M_V'$ at the corrected view point, using the above matrix $M_{VC}$ and the following equation:

$$\Delta M_V = M_{VC} \cdot \Delta M_C \cdot M_{VC}^{-1}$$

$$M_V' = \Delta M_V \cdot M_V \quad (19)$$

Where, $M_V$ represents a viewing transferring matrix of view point which is obtained through the output of the sensor and is prior to the correction.

The error distance is calculated in terms of the image-coordinate system in the first embodiment as illustrated in FIG. 16. However, as apparent from FIG. 26 and will be apparent from the second embodiment described later, the distance can be calculated in terms of the world coordinate system, thus providing the corrected view-transferring matrix at view point.

<Improvement of Detection Precision of Head Position>
. . . . Second Embodiment

In the above first embodiment, one camera 240L (240R) for monitoring a front view is arranged on the HMD 210L (210R). A marker image on the table 1000 captured by the camera 240 is processed by the processing unit 5060 to specify the marker in the image (step S420), the head posture of the player, i.e., the posture of the camera attached to the head, in other words, a view-transferring matrix by the camera with that posture, is determined. However, the first embodiment which merely utilizes errors in the terms of the image coordinate system, causes a three-dimensional displacement in the relationship between the camera and marker.

In addition, there may be cases for some applications of mixed reality presentation where markers should be positioned in a three-dimensional manner. The identifying method according to the first embodiment illustrated in FIG. 16, deteriorates reliability.

The second embodiment is proposed to eliminate the three-dimensional displacement as set forth, by means of providing each player with two cameras, and detecting markers in terms of the world coordinate system. The second embodiment is also proposed to relax the restricting condition that markers be positioned on a flat plane.

Figure 21:
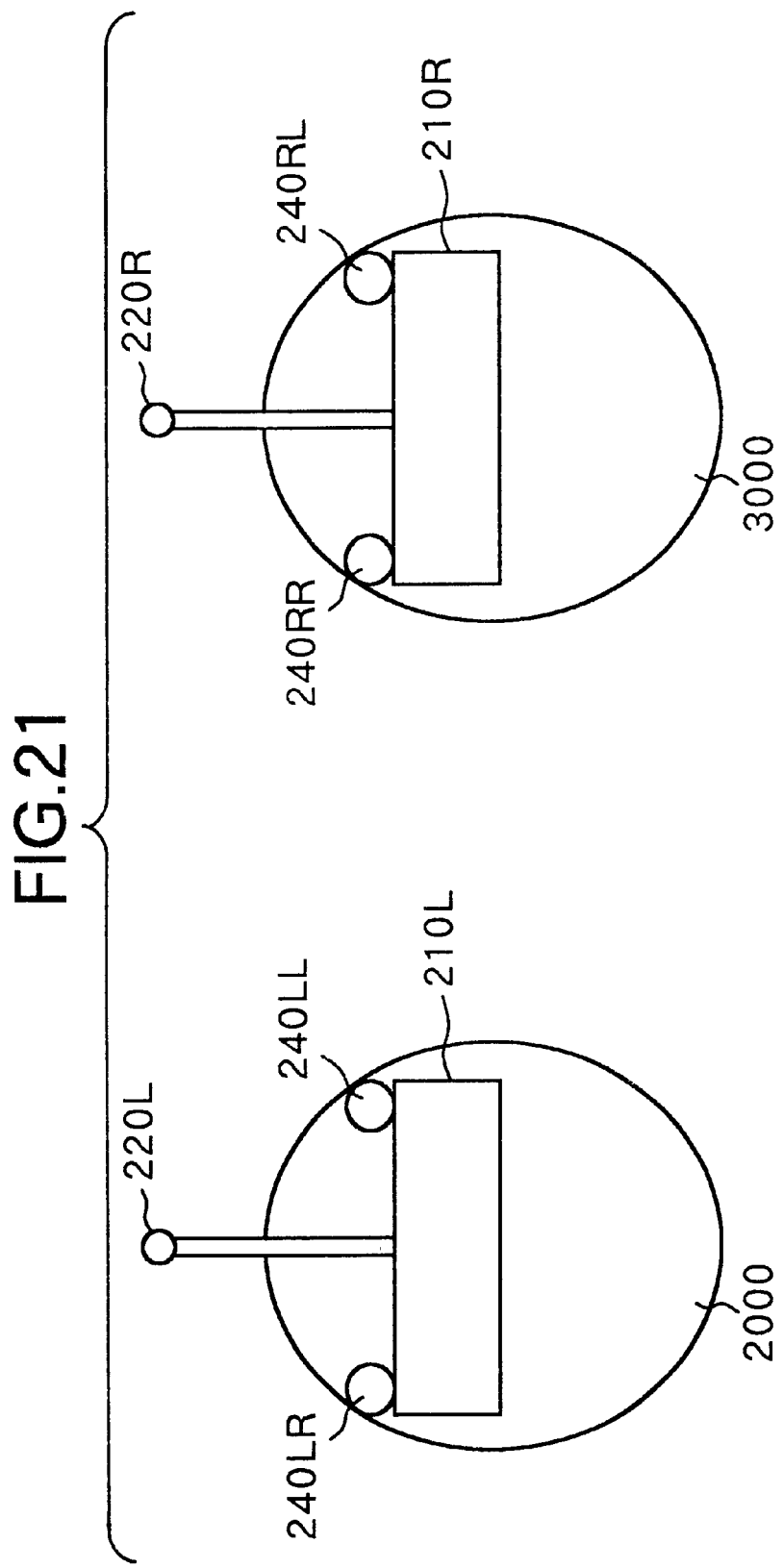
FIG. 21 is a view showing the arrangement of an HMD used in the second embodiment.

Specifically, the second embodiment employs, as shown in FIG. 21, two cameras 240LR and 240LL (240RR, 240RL) which are attached to the HMD 210L (210R) of the player 2000 (3000), and the postures of the cameras 240LR and 240LL (240RR, 240RL) are detected from stereoscopic images obtained from these cameras 240LR and 240LL (240RR, 240RL).

The second embodiment uses two cameras mounted on each player so as to cope with three-dimensionally arranged markers. However, described will be below the second embodiment which is applied to MR presentation for the hockey game using two-dimensionally arranged markers.

Figure 22:
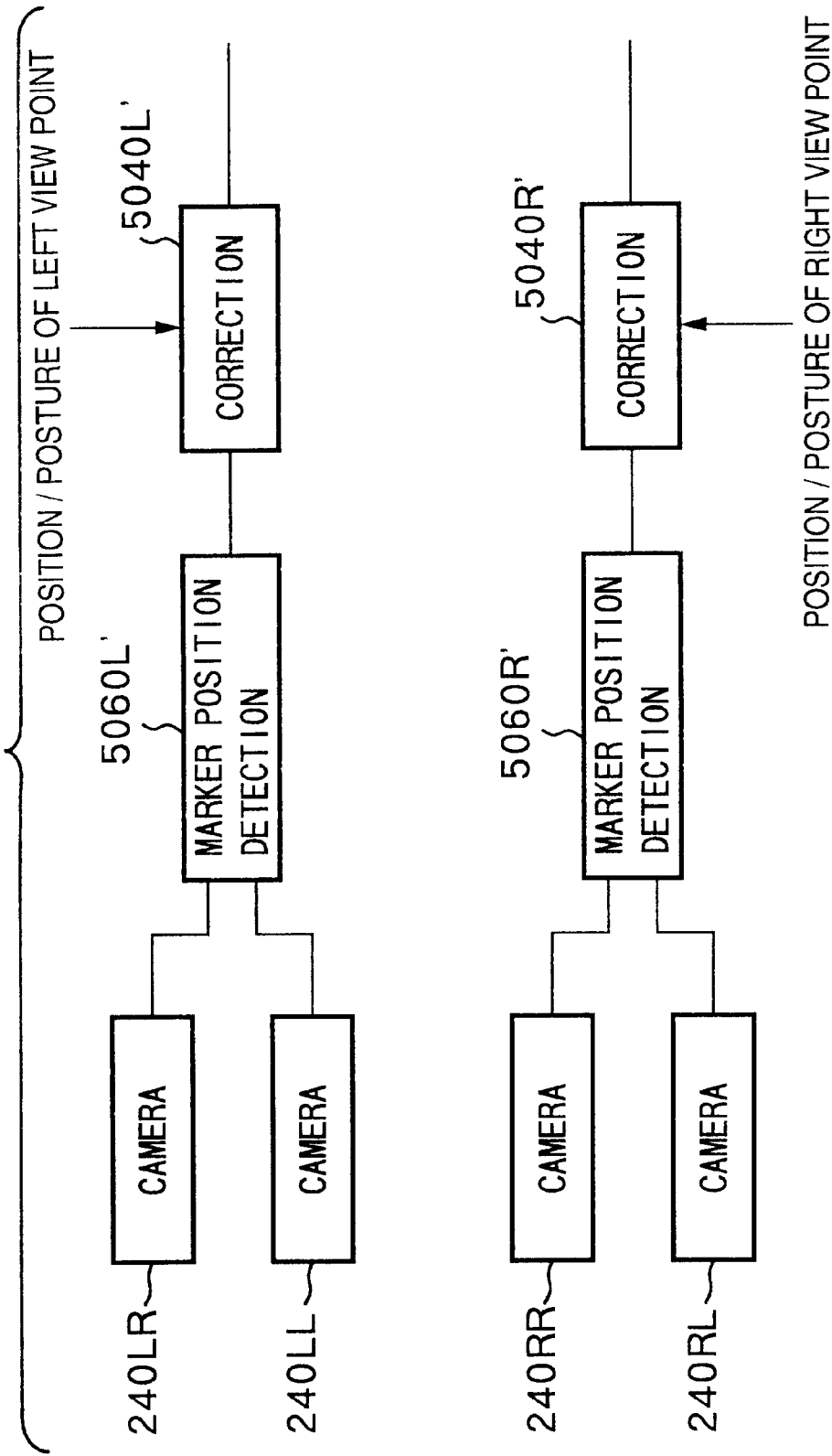
FIG. 22 is a block diagram showing the arrangement of principal part of an image processing system of the second embodiment.

FIG. 22 partially shows an image processing system according to the second embodiment. That is, FIG. 22 shows the modified blocks of the image processing system of the first embodiment (FIG. 7). More specifically, upon comparing FIGS. 7 and 22, although the image processing system of the second embodiment is different from the first embodiment since it comprises a marker position detection unit 5060L' (5060R') and correction processing unit 5040L' (5040R') in addition to the two cameras provided to each player, the marker position detection unit 5060L' (5060R') and correction processing unit 5040L' (5040R') of the second embodiment are merely different in software processing from the marker position detection unit 5060L (5060R) and correction processing unit 5040L (5040R) of the first embodiment.

Figure 23:
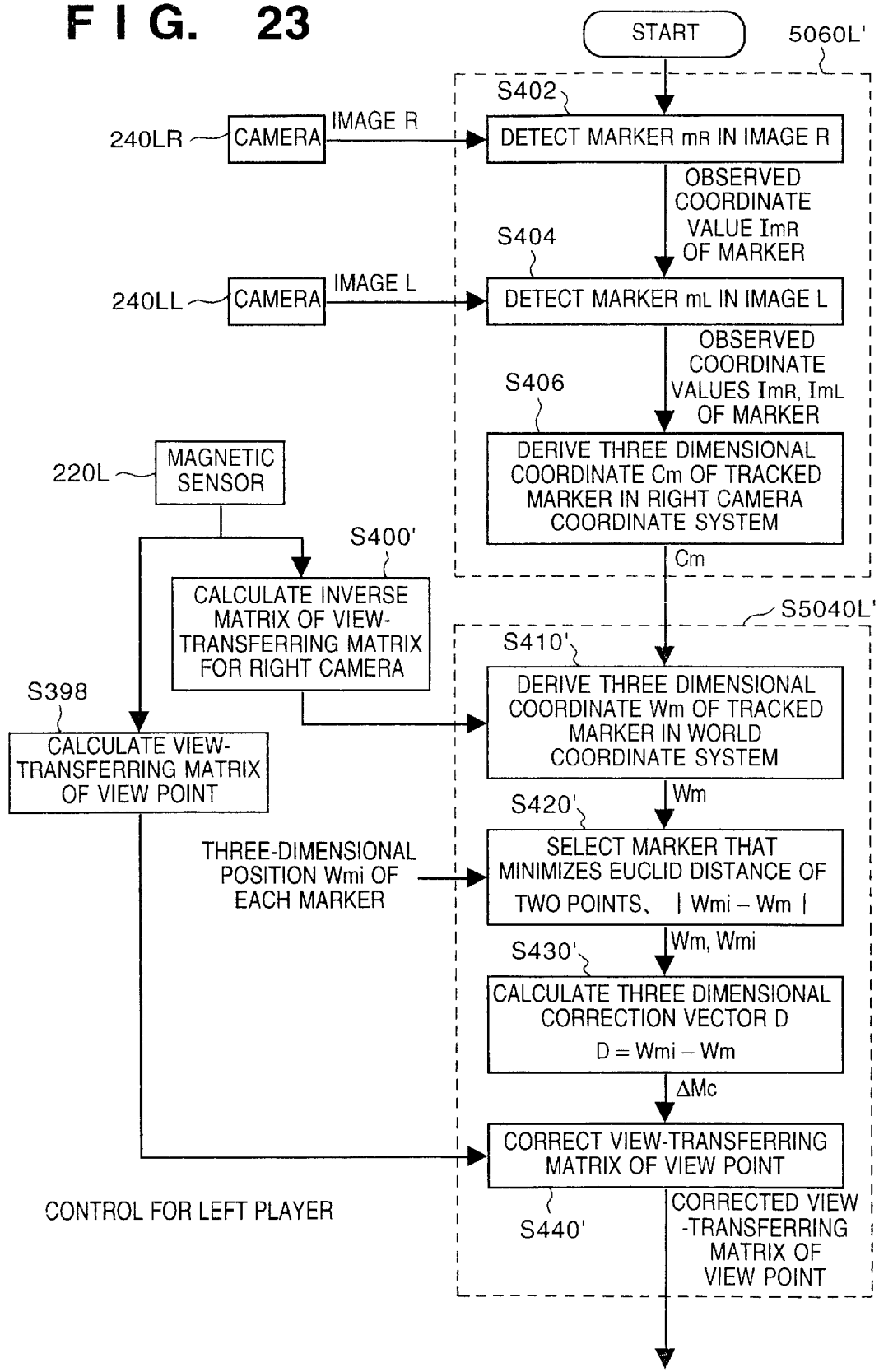
FIG. 23 is a flow chart showing some control steps of the image processing system of the second embodiment.

FIG. 23 shows the control sequence especially for the left player 2000 of that of the second embodiment. More particularly, collaborations among the marker position detection unit 5060L', position/posture detection unit 5000, and correction processing unit 5040L' corresponding to the control sequence in FIG. 16 of the first embodiment will be explained below.

In FIG. 23, the position/posture detection unit 5000, which is the same as that in the first embodiment, calculates the viewing transferring matrix of view point on the basis of the output from the magnetic sensor 220L, in step S398. In step S400', an inverse matrix of the viewing transferring matrix of the camera 240LR is calculated on the basis of the output of the magnetic sensor 220L. This transferring matrix is sent to the correction processing unit 5040'.

Images from the two cameras 240LL and 240LR are sent to the marker position detection unit 5060L'. That is, in step S402, the detection unit 5060L' extracts a marker image $m_R$ from an image R captured by the right camera 240LR. $I_{MR}$ represents the coordinate position of the extracted marker (i.e., the observation coordinate position). In step S404, the detection unit 5060L' extracts a marker image $m_L$ from an image L captured by the right camera 240LL. $I_{mL}$ represents the coordinate position of the extracted marker. Since the marker images $m_R$ and $m_L$ originate from an identical marker $m_X$, a three-dimensional position $C_m$ of the observed marker extracted on the coordinate system of camera 240LR is calculated from the pair of observed marker coordinate positions $(I_{mR}, I_{mL})$ on the basis of the principle of trigonometric measurement, in step S406.

In step S404, a corresponding point search of the marker image $m_L$ is made using a general stereoscopic viewing technique. Alternatively, in order to attain high-speed processing, the search range may be limited using a known epipolar bind.

Steps S410', S420', S422, and S430' in FIG. 23 are the processing operations in the correction processing unit 5040L'.

In step S410', the three-dimensional position $C_m$ of the observed marker on the camera coordinate system is transferred into a three-dimensional position $W_m$ on the world coordinate system using the view-transferring matrix calculated in step S400'. In step S420', three-dimensional positions $W_{mi}$ (known) of all the markers $m_i$ on the world coordinate system are read out from a predetermined memory, and $W_{mi}$ that minimizes the Euclidean distance $|W_{mi}-W_m|$ between each marker $m_i$ and the observed marker $m_X$ is determined. In other words, a known marker closest to the observed marker $m_X$ is identified.

Although $W_{mi}$ and $W_m$ are originally the same position, an error vector D (corresponding e in the first embodiment) is likely to be present due to error of the sensor 240. Hence, in step S420', a marker is specified that has a coordinate value $W_{mi}$ closest to the three-dimensional coordinate value (in the world coordinate system) of the tracked (observed) marker. Then, in step S430', a correction vector D representing distance between the tracked marker and the determined marker is calculated from:

$$D = W_{mi} - W_m \quad (20)$$

, and then $\Delta M_C$, which moves the position of the camera by the vector amount, is obtained. In step S440', a viewing transferring matrix of view point is calculated using a method similar to the first embodiment.

In this manner, since the present invention can improve position detection of the observed marker in a three-dimensional manner using the HMD with two cameras, the position and posture of a view-point can be precisely detected, thus, virtual and real images for MR can be smoothly connected.

<1st Modification>

The present invention is not limited to the first and second embodiments above.

Figure 24:
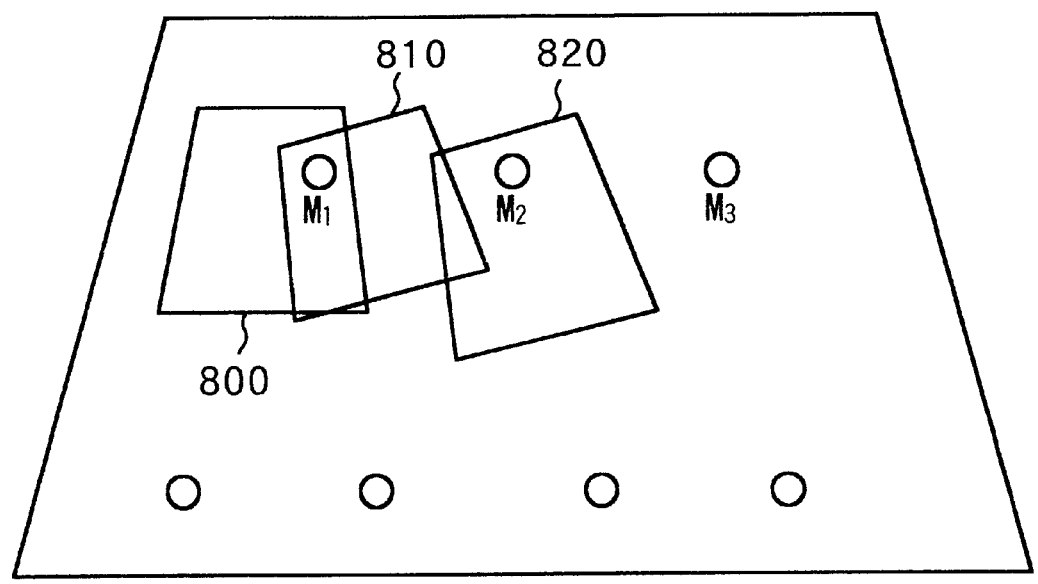
FIG. 24 is a view for explaining transition of a reference marker used in a modification of the embodiment.

In the first embodiment, the processing for detecting a marker from the image uses the marker detected first as the marker to be tracked, as shown in FIG. 17. For this reason, as shown in, e.g., FIG. 24, when an image 800 including a marker $M_1$ is obtained in a certain frame, if the marker is included in an image region 810 of the subsequent frame although it is located at an end portion of the region 810, the marker $M_1$ can be determined as a reference marker for correction. However, when, for example, an image 820 is obtained in the subsequent frame, if the marker $M_1$ falls outside the region of that image, and a marker $M_2$ is included instead, the reference marker for correction must be changed to that marker $M_2$. Such changes in marker are also required when tracking fails, and positional deviation correction uses the newly tracked marker.

As a problem posed upon switching the marker used in correction, a virtual object may unnaturally move due to abrupt changes in correction value upon switching the marker.

To prevent this problem, in a modification to be proposed below, the correction value of the previous frame is reflected upon setting the next correction value so as to keep temporal matching between these correction values.

More specifically, let $v_t$ be the correction value (a three-dimensional vector representing translation on the world coordinate system) in a certain frame, and $v'_{t-1}$ be the correction value in the previous frame. Then, $v'_t$ obtained by the equation below is used as a new correction value:

$$v'_t = \alpha v'^{-1}_t + (1-\alpha) \cdot v^t \quad (21)$$

where $\alpha$ is a constant $(0 \leq \alpha < 1)$ that defines the degree of influence of the previous information. The equation above implies that $\alpha$ represents the degree of contribution of the correction value $v'_{t-1}$ in the previous frame, and the correction value $v_t$ obtained in the present frame is used at the degree of contribution of $(1-\alpha)$.

With this control, abrupt changes in correction value can be relaxed, and a three-dimensional virtual image can be prevented from being suddenly changed (unnaturally moved). By setting a new correction value $\alpha$ at a proper value, an object can be prevented from unnaturally moving upon switching of the marker.

<2nd Modification>

In the above embodiment, when a marker cannot be found in a local search, the processing for detecting a marker from the image uses a point with the highest similarity on the entire frame as the marker to be tracked independently of the marker position in the previous frame. In a modification to be proposed below, a marker search is made on the basis of the marker position found in the previous frame. Even when the image frame has moved upon movement of the player, the marker is likely to be present at a position which is not largely offset from the position in the previous frame.

Figure 25:
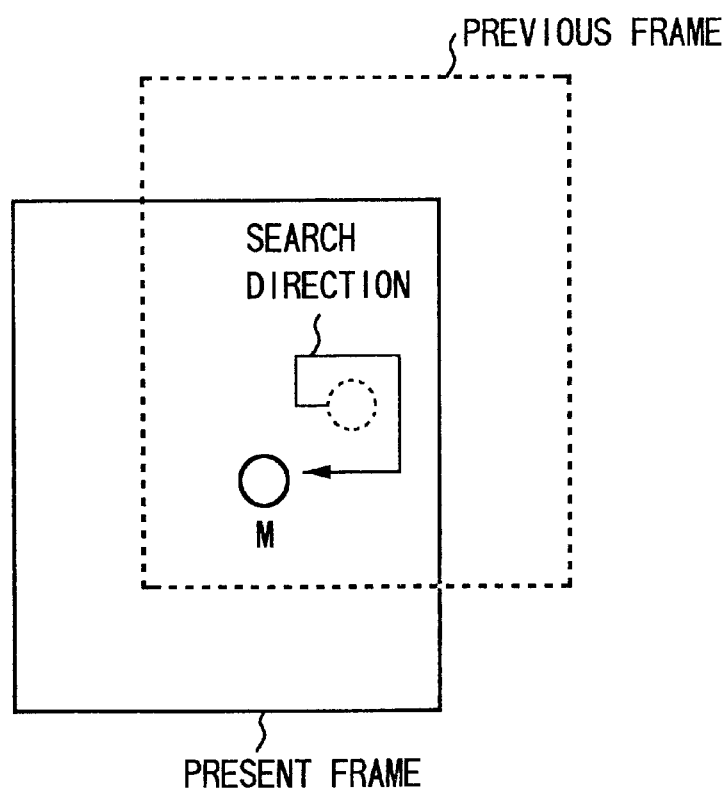
FIG. 25 is a view for explaining the principle of marker search used in a modification of the embodiment.

FIG. 25 is a view for explaining the principle of search for a marker found in the previous frame from the present frame. The marker search is made along such search route, and if a point having a similarity equal to or higher than a given threshold value is found, this point is used as the marker.

<3rd Modification>

The above embodiment uses an optical HMD. However, the present invention is not limited to an optical HMD, but may be applied to a video-see-through HMD.

<4th Modification>

In the above embodiment, the present invention is applied to the air hockey game. However, the present invention is not limited to the air hockey game.

In the present invention, since the operations (e.g., mallet operations) of a plurality of operators are sensed and captured using a single camera means, the operations of the plurality of operators can be reproduced in a single virtual space. Hence, the present invention can be suitably applied to any other collaborative operations based on at least two operators (e.g., MR presentation of design works by a plurality of persons, a battle game requiring a plurality of players).

The processing for correcting the head posture position based on a plurality of markers of the present invention is suitable not only for collaborative operations of a plurality of operators but also for a system that presents MR to a single operator (or player).

<Other Modifications>

There may be proposed a modification in which more than three cameras be used in the second embodiment.

It is enough for the camera 240 of the embodiments to capture at least one marker in images sensed by the camera. Too many markers would result in a number of markers captured in images by the camera, that would cause erroneous identification of markers in the above process for identifying a tracked marker, described associated with step S430 of FIG. 16 and step S430' of FIG. 23. Therefore, the number of the markers may be reduced so that only one marker may be captured in the images, if movement of the players may be limited.

Further, the position/posture detection apparatus as set forth outputs the view-transferring matrix at player s view point. The present invention is not limited to such apparatus, and may be applied to such apparatus as outputs a corrected view point of the players in a format of (X, Y, Z, r, p, φ), where, r denotes rolling angle, p, pitch angle, and φ, yaw angle.

As described above, according to the present invention, since the operations of a plurality of operators are captured by a single camera or sensor, the positional relationship of the individual operators required for presenting MR can be systematically recognized.

Also, according to the present invention, since a plurality of markers are sensed by the camera, at least one marker is captured in that image. Hence, even when the operator moves across a broad work range or moving range, the head position of the operator can be tracked, thus allowing MR presentation over the broad range.

As many apparently widely different embodiments of the present invention can be made without departing from the spirit and scope thereof, it is to be understood that the invention is not limited to the specific embodiments thereof except as defined in the appended claims.

What is claimed is:

1. A mixed reality presentation apparatus which generates a three-dimensional virtual image associated with a collaborative operation to be done by a plurality of operators in a common mixed reality environment, and displays the generated virtual image on display devices respectively attached to the plurality of operators, comprising, first sensor means for detecting a status of each of the actuators which are operated by the plurality of operators and move as the collaborative operation progresses;

second sensor means for detecting a view point position of each of the plurality of operators in an environment of the collaborative operation; and generation means for generating a three-dimensional model in said common mixed reality environment, said generation means generating three-dimensional virtual images by transforming the three-dimensional model on the basis of an operation result of the collaborative operation that has progressed according to a change in status of each of the plurality of actuators detected by said first sensor means and the view point position of each operator detected by said second sensor means, and outputting the generated three-dimensional virtual images that are viewed from the view point position of each operator to each display device.

2. The apparatus according to claim 1, wherein said first sensor means comprises:

an image sensing camera which includes maximum moving ranges of the actuators, each of which moving upon operation of each respective operator, with a field of view thereof; and image processing means for performing image-processing to detect a position of each actuator in an image obtained by said camera.

3. The apparatus according to claim 1, wherein the actuator includes an illuminator emitting light having a predetermined wavelength, and said first sensor means comprises a camera which is sensitive to the light having the predetermined wavelength.

4. The apparatus according to claim 1, wherein the actuator is a mallet operated by a hand of the operator.

5. The apparatus according to claim 1, wherein the display device comprises an optical transmission type display device.

6. The apparatus according to claim 1, wherein said second sensor means comprises:

a generator for generating an AC magnetic field; and a magnetic sensor attached to the head portion of each operator.

7. The apparatus according to claim 1, wherein said second sensor means detects a head position and posture of each operator, and calculates a view point position in accordance with the detected head position and posture.

8. The apparatus according to claim 1, wherein said generation means comprises:

storage means for storing a rule of the collaborative operation;

means for generating a virtual image representing a progress result of the collaborative operation in accordance with the rule stored in said storage means in correspondence with detected changes in position of the plurality of actuators; and means for generating a three-dimensional virtual image for each view point position by transferring a coordinate position for each view point position of each operator detected by said second sensor means.

9. A game apparatus having a mixed reality presentation apparatus of claim 1.

10. A mixed reality presentation apparatus which generates a three-dimensional virtual image associated with a collaborative operation to be done by a plurality of operators in a common mixed reality environment, and displays the generated virtual image on display devices respectively attached to the plurality of operators, comprising:

a camera arranged so as to include a plurality of actuators operated by the plurality of operators in the collaborative operation within a field of view thereof;

actuator position detection means for outputting information relating to positions of the actuators associated with a coordinate system of that environment on the basis of an image sensed by said camera;

sensor means for detecting and outputting a view point position of each of the plurality of operators in the environment of the collaborative operation; and image generation means for defining a three-dimensional model in a common field of view of the plurality of operators and generating a three-dimensional virtual image of said three-dimensional model as a progress result that is viewed from the view point position of each operator detected by said sensor means to each display device so as to present the progress result of the collaborative operation relating to said three-dimensional model that has progressed according to detected changes in position of the actuator to each operator.

11. A mixed reality presentation apparatus which generates a three-dimensional virtual image associated with a collaborative operation to be done by a plurality of operators in a predetermined mixed reality environment, and displays the generated virtual image on see-through display devices respectively attached to the plurality of operators, comprising:

a first camera which substantially includes the plurality of operators within a field of view thereof;

a first processor arranged so as to calculate operation positions of the plurality of operators on the basis of an image obtained by said first camera;

a detection device detecting a view point position of each operator using a plurality of sensors attached to the plurality of operators;

a plurality of second cameras sensing front fields of the individual operators, at least one second camera being attached to each of the plurality of operators;

a second processor calculating information associated with a line of sight of each operator on the basis of each of images from said plurality of second cameras;

a third processor correcting the view point position of each operator detected by the sensor using the line of sight information from said second processor and outputting the corrected view point position as a position on a coordinate system of the mixed reality environment;

a first image processing device making the collaborative operation virtually progress on the basis of the operation position of each operator calculated by said first processor, and generating three-dimensional virtual images representing results that have changed along with the progress of the collaborative operation for the plurality of operators; and a second image processing device transferring coordinate positions of the three-dimensional virtual images for the individual operators generated by said first image processing device in accordance with the individual corrected view point positions calculated by said third processor, and outputting the coordinate-transferred images to the see-through display devices.

12. A method of generating a three-dimensional virtual image associated with a collaborative operation to be done within a common mixed reality environment so as to display the image on display devices attached to a plurality of operators in the common mixed reality environment, comprising:

the image sensing step of sensing a plurality of actuators operated by the plurality of operators by a camera that includes the plurality of operators within a field of view thereof;

the actuator position acquisition step of calculating information relating to positions of the actuators associated with a coordinate system of the common mixed reality environment on the basis of the image sensed by the camera;

the view point position detection step of detecting a view point position of each of the plurality of operators in the common mixed reality environment of the collaborative operation on the coordinate system of the common mixed reality environment;

the progress step of making the collaborative operation virtually progress in accordance with changes in position of the plurality of actuators calculated in the actuator position acquisition step; and the image generation step of generating a three-dimensional model in the common mixed reality environment and outputting a three-dimensional virtual image of said three-dimensional model as a progress result in the progress step that is viewed from the view point position of each operator detected in the view point position detection step to each display device so as to present the progress result in the progress step to each operator.

13. A storage medium which stores a program that implements a method of claim 12.

14. A game apparatus which incorporates a storage medium of claim 13.

15. A mixed reality presentation method for generating a three-dimensional virtual image associated with a collaborative operation to be done by a plurality of operators in a predetermined mixed reality environment, and displaying the generated virtual image on see-through display devices respectively attached to the plurality of operators, comprising:

the first image sensing step of capturing an image using a first camera which substantially includes the plurality of operators within a field of view thereof;

the first detection step of detecting operation positions of the plurality of operators on the basis of the image sensed by the first camera;

the second detection step of detecting a view point position of each operator using a plurality of sensors respectively attached to the plurality of operators;

the second image sensing step of sensing a front field of each operator using each of a plurality of second cameras, at least one second camera being attached to each of the plurality of operators;

the line of sight calculation step of calculating information associated with a line of sight of each operator on the basis of each of images obtained from the plurality of second cameras;

the correction step of correcting the view point position of each operator detected by the sensor on the basis of the line of sight information calculated in the line of sight calculation step, and obtaining the corrected view point position as a position on a coordinate system of the mixed reality environment;

the generation step of making the collaborative operation virtually progress on the basis of the operation positions of the individual operators detected in the first detection step, and generating three-dimensional virtual images that represent results of the collaborative operation and are viewed from the view point positions of the plurality of operators; and the step of transferring coordinate positions of the three-dimensional virtual images for the individual operators in the generation step in accordance with the individual corrected view point positions obtained in the correction step, and outputting the coordinate-transferred images to the see-through display devices.

16. A storage medium which stores a program that implements a method of claim 15.

17. A position/posture detection apparatus for detecting a position/posture of a predetermined portion of an operator or an object operated by the operator, comprising:
- a position/posture sensor for measuring a three-dimensional position and posture of the predetermined portion of the operator or the object operated by the operator to output an operator's position and posture signal;
- a camera sensing images of a first plurality of markers arranged at known positions in the environment;
- detection means for processing an image signal from said camera, tracking a marker of the first plurality of markers, and detecting a coordinate value of the tracked marker in a coordinate system; and
- calculation means for calculating a position/posture signal representing a position and posture of the operating portion, including correction of the operator's position and posture signal outputted from the position/posture sensor based on the coordinate value of the tracked marker detected by said detection means.

18. The apparatus according to claim 17, wherein a distance between one marker and another marker of the plurality of markers in a direction crossing in front of the operator is set to be larger as the marker are farther from the operator.

19. The apparatus according to claim 17, wherein where a plurality of operators perform a collaborative operation, marker for one operator are of the same representation manner.

20. The apparatus according to claim 17, wherein the predetermined portion is a view point position of the operator.

21. The apparatus according to claim 17, wherein said detection means uses a marker firstly found within an image obtained by said camera.

22. The apparatus according to claim 17, wherein said detection means comprises means for searching an image of a present scene for a marker found in an image of a previous scene.

23. The apparatus according to claim 17, wherein the sensor is mounted on the head of the operator.

24. The apparatus according to claim 17, wherein a layout distribution density of the plurality of markers in the environment is set so that a density distribution of markers farther from the operator is set to be lower than a density distribution of markers closer to the operator.

25. The apparatus according to claim 17, wherein the first plurality of markers are arranged within the environment so that at least one marker is captured within the field of image of the camera.

26. The apparatus according to claim 17, wherein said detection means calculates a coordinate of the tracked marker in an image coordinate system.

27. The apparatus according to claim 17, wherein said detection means calculates a coordinate of the tracked marker in camera coordinate system.

28. The apparatus according to claim 27, wherein said first plurality of markers are arranged in a three-dimensional manner.

29. The apparatus according to claim 17, wherein the first plurality of markers are depicted on a planar table arranged within the environment.

30. The apparatus according to claim 17, wherein said detection means comprises identifying means for identifying a marker to be tracked from among said first plurality of markers.

31. The apparatus according to claim 30, wherein the identifying means identifies a marker selected by the selection means in terms of an image coordinate system.

32. The apparatus according to claim 31, wherein the identifying means comprises:
- means for detecting a signal represent a position/posture of the camera;
- means for converting three-dimensional coordinates of said first plurality of markers in a world coordinate system into a coordinate value in terms of the image coordinate system, in accordance with the signal representing position/posture of the camera; and
- means for identifying a marker to be tracked by comparing the coordinates of the first plurality of markers in the world coordinate system and an image coordinate value of the tracked marker.

33. The apparatus according to claim 30, wherein the identifying means identifies a marker selected by the selection means in terms of a world coordinate system.

34. The apparatus according to claim 33, wherein the identifying means comprises:
- means for detecting a signal representing a position/posture of the camera;
- means for converting a coordinate of the tracked marker in terms of a camera coordinate system into a coordinate value in terms of the world coordinate system; and
- selection means for selecting said at least one marker to be tracked by comparing coordinates of the tracked marker and coordinates of the first plurality of markers, in terms of the world coordinate system.

35. The apparatus according to claim 17, wherein said detection means comprises means for selecting, where said detection means detects a second plurality of markers within an image capture by said camera, one marker to be tracked from among said second plurality of markers.

36. The apparatus according to claim 17, wherein the predetermined portion includes a view position of the operator,
said calculation means obtains the position/posture signal at a view point of the operator with correction of said operator's position and posture signal based on a distance difference between an image coordinate value of the tracked marker detected by said detection means and a converted coordinate value of the tracked marker which is converted from a known three dimensional coordinate value of the marker in the world coordinate system into the image coordinate system.

37. The apparatus according to claim 17, wherein the predetermined portion includes a view position of the operator,
said calculation means obtains the position/posture signal at a view point of the operator with correction of said operator's position and posture signal based on a distance difference between a coordinate value of the tracked marker which is converted from the camera coordinate system into the world coordinate system and a known three dimensional coordinate value of the marker in the world coordinate system.

38. The apparatus according to claim 17, wherein the sensor comprises a magnetic sensor mounted on the head of the operator.

39. The apparatus according to claim 17, wherein said camera includes a plurality of camera units attached to the operator's head; and
said detection means tracks the marker in the camera coordinate system.

40. The apparatus according to claim 30, wherein said camera includes two cameras units.

41. A mixed reality presentation apparatus comprising:
a work table having a first plurality of markers arranged at known positions;
a position/posture sensor attached to an operator to detect a head position and posture of the operator and to output an operator's head position/posture signal;
a camera being set to capture at least one of the first plurality of markers within a field of view of the camera;
a detection means for processing an image signal from the camera, tracking a marker from among the first plurality of markers, and detecting a coordinate value of a tracked marker;
calculation means for calculating a position/posture signal representing a position and posture of the operator's view point, including correction of the operator's head position/posture signal outputted from the position/posture sensor based on the coordinate value of the tracked marker detected by said detection means; and
generation means for generating a virtual image for presenting a mixed reality at the view point in accordance with the calculated position/posture signal.

42. The apparatus according to claim 41, wherein a distance between one marker and another marker of the plurality of markers in a direction crossing in front of the operator is set to be larger as the markers are farther from the operator.

43. The apparatus according to claim 41, wherein where a plurality of operators perform a collaborative operation, markers for one operator are of the same representation manner.

44. The apparatus according to claim 41, wherein said detection means comprises:
means for tracking a marker within an image obtained by the camera; and
means for outputting a coordinate value of the tracked marker in an image coordinate system.

45. The apparatus according to claim 44, wherein said detection means uses a marker firstly found within an image obtained by said camera.

46. The apparatus according to claim 44, wherein said detection means comprises means for searching an image of a present scene for a marker found in an image of a previous scene.

47. The apparatus according to claim 41, wherein a layout distribution density of the plurality of markers in the environment is set so that a density distribution of markers farther from the operator is set to be lower than a density of distribution markers closer to the operator.

48. The apparatus according to claim 41, wherein the first plurality of markers are arranged within the environment so that at least one marker is captured within the field of image of the camera.

49. The apparatus according to claim 41, wherein said detection means calculates a coordinate of the tracked marker in an image coordinate system.

50. The apparatus according to claim 41, wherein said detection means calculates a coordinate of the tracked marker in camera coordinate system.

51. The apparatus according to claim 41, wherein the first plurality of markers are depicted on a planar table arranged within the environment.

52. The apparatus according to claim 41, wherein said first plurality of markers are arranged in a three-dimensional manner.

53. The apparatus according to claim 41, wherein said detection means comprises:
identifying means for identifying a marker to be tracked from among said first plurality of markers.

54. The apparatus according to claim 53, wherein the identifying means identifies a marker in terms of an image coordinate system.

55. The apparatus according to claim 53, wherein the identifying means identifies a marker in terms of a world coordinate system.

56. A position/posture detection method for detecting an operation position of an operator so as to generate a three-dimensional virtual image associated with an operation to be done by the operator in a predetermined mixed reality environment, comprising:
the step of measuring to output an operator position/posture signal indicative of a three-dimensional position and posture of the operator;
the step of processing an image signal from a camera which captures a plurality of markers arranged in the environment, tracking at least one marker and detecting a coordinate of said at least one marker; and
outputting a head position/posture signal indicative of a position and posture of the head of the operator, including correction of the measured operator position/posture signal based on the coordinate values of the at least one tracked marker detected by said processing step.

57. A method of presenting a mixed reality in accordance with a position and posture of view point of the operator detected by the method according to claim 56.

58. A storage medium which stores a computer program that describes a method of claim 57.

59. A method according to claim 56, further comprising:
tracking at least one marker by processing image signals sensed by a plurality of camera units mounted on the head of the operator, with a tri-angle measurement method.

60. A storage medium which stores a computer program that describes a method of claim 59.

61. A storage medium which stores a computer program that describes the method of claim 56.

62. A position/posture detection apparatus for detecting an operation position of an operator, comprising:
a position/posture sensor for measuring a three-dimensional position and posture of the operator to output an operator's position and posture signal;
a camera sensing images of a first plurality of markers arranged at known positions in the environment;
detection means for processing an image signal from said camera, tracking a marker of the first plurality of markers, and detecting a coordinate value of the tracked marker in a coordinate system; and
correction means for correcting an output signal from the sensor on the basis of coordinate value of the tracked marker.

* * * * *

UNITED STATES PATENT AND TRADEMARK OFFICE
CERTIFICATE OF CORRECTION

PATENT NO. : 6,522,312 B2
DATED : February 18, 2003
INVENTOR(S) : Toshikazu Ohshima et al.

It is certified that error appears in the above-identified patent and that said Letters Patent is hereby corrected as shown below:

<u>Title page,</u>
Item [56], References Cited, U.S. PATENT DOCUMENTS,
"Klalpman et al." should read -- Klapman et al. --.
Item [57], ABSTRACT,
Lines 7, 12 and 18, "view point" should read -- viewpoint --;

<u>Drawings,</u>
Sheet 7, Figure 7, "DITECTION" (all occurrences) should read -- DETECTION --.
Sheet 22, Figure 23, "THREE DIMENSIONAL" (all occurrences) should read
-- THREE-DIMENSIONAL --.

<u>Column 3,</u>
Line 38, "reality In" should read -- reality. ¶ In --.

<u>Column 10,</u>
Line 9, "three dimen-" should read -- three-dimen- --;
Line 14, "vie" should read -- view --;
Line 22, "three dimensional" should read -- three-dimensional --;
Line 30, "Preciseness" should read -- preciseness --; and
Line 47, "can been" should read -- can be --.

<u>Column 11,</u>
Line 67, "players" should read -- players. --.

<u>Column 12,</u>
Line 5, "aplayer's" should read -- a player's --; and
Line 48, "HmD" should read -- HMD --.

<u>Column 14,</u>
Line 24, "an," should read -- a --;
Line 25, "describe," should read -- described --;
Line 26, "to a" should read -- to use a --; and
Line 28, "to track" should read -- tracking --.

<u>Column 16,</u>
Line 24, "Is" should read -- Is --; and

Line 44, "$Ix = \frac{SUMx}{N} \ Iy = \frac{SUMy}{N}$" should read "$Ix = \frac{SUMx}{N} \ ¶ \ Iy = \frac{SUMy}{N}$"

UNITED STATES PATENT AND TRADEMARK OFFICE
CERTIFICATE OF CORRECTION

PATENT NO. : 6,522,312 B2
DATED : February 18, 2003
INVENTOR(S) : Toshikazu Ohshima et al.

It is certified that error appears in the above-identified patent and that said Letters Patent is hereby corrected as shown below:

Column 19,
Line 31, "a" should read -- an --.

Column 25,
Line 28, "player s" should read -- player's --.

Column 30,
Line 42, "three dimensional" should read -- three-dimensional --.

Column 31,
Line 1, "claim 30," should read -- claim 39, --.

Column 32,
Line 35, "view point" should read -- viewpoint --.

Signed and Sealed this

Twentieth Day of January, 2004

JON W. DUDAS
*Acting Director of the United States Patent and Trademark Office*